US006882653B1

(12) United States Patent
Kiuchi et al.

(10) Patent No.: US 6,882,653 B1
(45) Date of Patent: Apr. 19, 2005

(54) GATEWAY SYSTEM HAVING CONTROLLER AND SIGNAL PROCESSOR FOR INTERCONNECTING IP NETWORK AND TELEPHONE NETWORK AND METHOD FOR CONTROLLING ALTERNATIVE ROUTING AT THE TIME OF FAULT OF GATEWAY SYSTEM

(75) Inventors: Yoshinao Kiuchi, Yokohama (JP); Hajime Abe, Yokohama (JP); Takaaki Higashi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 814 days.

(21) Appl. No.: 09/651,100

(22) Filed: Aug. 30, 2000

(30) Foreign Application Priority Data

May 22, 2000 (JP) ...................................... 2000-154396

(51) Int. Cl.[7] .............................................. H04L 12/28
(52) U.S. Cl. ....................... 370/401; 370/217; 370/218; 370/219; 370/225
(58) Field of Search ................................ 370/353, 354, 370/216, 217, 218, 219, 220, 225, 226, 227, 228, 401, 253

(56) References Cited

U.S. PATENT DOCUMENTS

| 4,999,829 | A | | 3/1991 | Fite, Jr. et al. | |
|---|---|---|---|---|---|
| 5,065,399 | A | | 11/1991 | Hasegawa et al. | |
| 6,185,215 | B1 | * | 2/2001 | Aho | 370/402 |
| 6,347,075 | B1 | * | 2/2002 | Barzegar et al. | 370/228 |
| 6,366,557 | B1 | * | 4/2002 | Hunter | 370/217 |
| 6,388,988 | B1 | * | 5/2002 | Jabbarnezhad | 370/228 |
| 6,426,955 | B1 | * | 7/2002 | Gossett Dalton, et al. | 370/401 |
| 6,449,259 | B1 | * | 9/2002 | Allain et al. | 370/253 |
| 6,463,032 | B1 | * | 10/2002 | Lau et al. | 370/218 |
| 6,515,997 | B1 | * | 2/2003 | Feltner et al. | 370/401 |
| 6,519,224 | B2 | * | 2/2003 | Hrastar et al. | 370/227 |
| 6,542,476 | B1 | * | 4/2003 | Elizondo et al. | 370/278 |
| 6,563,815 | B1 | * | 5/2003 | Koyama | 370/352 |
| 6,591,301 | B1 | * | 7/2003 | Li et al. | 709/229 |

FOREIGN PATENT DOCUMENTS

EP 789470 8/1997

* cited by examiner

*Primary Examiner*—Douglas Olms
*Assistant Examiner*—Steven Blount
(74) *Attorney, Agent, or Firm*—Antonelli, Terry, Stout & Kraus, LLP

(57) ABSTRACT

To detect network faults or congestion of traffic at an interface of a gateway system for connecting an IP network and a telephone network on the side of the IP network and to allow the IP network to control alternative routing at the telephone network, network faults and congestion of traffic on the side of the IP network are monitored by the gateway system having an interface function between the telephone network and the IP network. When a network fault or congestion of traffic is detected, the gateway system notifies the telephone network upstream thereof of the disabled line and instructs the same to perform alternative routing, which makes it possible to prevent the occurrence of a situation in which the quality of communication at the interface between the telephone network and IP network can not be maintained.

15 Claims, 22 Drawing Sheets

GATEWAY SYSTEM HAVING CONTROLLER AND SIGNAL PROCESSOR FOR INTERCONNECTING IP NETWORK AND TELEPHONE NETWORK AND METHOD FOR CONTROLLING ALTERNATIVE ROUTING AT THE TIME OF FAULT OF GATEWAY SYSTEM

BACKGROUND OF THE INVENTION

The present invention relates to a method for connecting a telephone network and an IP network (internet protocol network), a method for detecting faults and a method for controlling alternative routing.

Particularly, the present invention relates to a method for connecting a telephone network and an IP network in an internet gateway system constituted by a signaling gateway/media gateway controller and a gateway device, the method detecting a fault at an IP network interface of the gateway device, blocking the line to the upstream telephone network and instructing alternative routing.

Presently available measures to detect a fault between nodes of a telephone network include monitoring of the state of a common line signal link between opposite at an interface between networks, monitoring of frame bits of a communication line and monitoring of the state of a circuit between a network and a user terminal at a user/network interface. Referring to presently available measures to notify each of nodes forming a network of a fault or congestion of traffic and to instruct it on alternative routing, a fault of a common line signal can be notified and an instruction can be made on alternative routing utilizing a message transfer part (MTP) of a common channel signaling #7 (CCS7) at an interface between networks; blocking of a communication line can be instructed utilizing a blocking signal in an ISDN user part (ISUP); and an instruction on alternative routing can be made using a redirection procedure according to the TTC (Telecommunication Technology Committee) specifications or using a pivot procedure according to the ITU-T (International Telecommunication Union) recommendations and TTC specifications.

Referring to user/network interfaces, there is no measure to allow a user apparatus including a gateway device for an IP network to notify of a telephone network of a fault and to instruct alternative routing, and alternative routing is performed by the network by means of line state monitoring and incoming call transfer. As another measure to allow alternative routing, when an incoming call number is converted at a service control point (SCP) in an IN (Intelligent Network Internetwork Interface) procedure, control may be performed to provide an effect equivalent to alternative routing by switching the converted number depending on the state of the network.

Measures to detect a fault between nodes of an IP network include a method in which congestion of traffic or a fault between opposite nodes is detected by exchanging a message such as "ping" according to the ICMP (Internet Control Message Protocol) defined in the RFC (Requests for Comments) of the IETF (Internet Engineering Task Force) between the opposite nodes and a method in which the state of the apparatus at each of nodes forming a network is collected using a network manager such as an SNMP (Simple Network Management Protocol) manager or gate keeper defined in the RFC1157. Referring to the method for notifying a fault or congestion of traffic and instructing alternative routing, a method is used in which routing information is distributed to each of nodes forming a network using a router or a network manager such as an SNMP manager or gate keeper according to a dynamic routing protocol such as the RIP (Routing Information Protocol) defined in the RFC2453, the OSPF (Open Shortest Path Fast) defined I the RFC2328 or the BGP (Border Gateway Protocol) defined in the RFC1771.

SUMMARY OF THE INVENTION

In a mode of service in which a telephone network and an IP network are interconnected through a gateway system comprising a plurality of gateway devices that share a plurality of lines with a single or a plurality of called numbers, the above-described methods are available for detecting faults in each of the telephone network and IP network and for controlling alternative routing. However, since a fault or congestion of traffic in the IP network can not be recognized in the telephone network, incoming calls are accepted for a group of lines that utilize the routing channel having a fault in the IP network in spite of the fact that there is a group of lines over which incoming calls with the same called number can be properly received, which may cause call loss and reduction in the service quality of communication.

In such a mode of service in which a telephone network and an IP network are interconnected through a gateway system, it is an object of the present invention to provide a gateway system and a method for alternative routing in which faults in apparatuses in the gateway system and IP network are detected by the gateway system to prevent a group of lines utilizing a path having a fault as described above from being selected by instructing the telephone network to perform alternative routing, thereby ensuring quality of connection in the service for interconnecting the telephone network and IP network. According According to the present invention, as one measure to detect an IP network interface fault or congestion of traffic in a gateway system, a gateway system is provided with a function of monitoring the number of packets held in the gateway system and internal resources of the gateway system and detecting a state of faults in the gateway system and an access path to an IP network so as to detect the state of a line for connecting the telephone network to the IP network.

Further, there is provided a function of monitoring server response times with a timer when a gateway device as described above transmits IP packets to various servers in an IP network for purposes such as authentication, accounting and acquisition of IP address information, and a function of measuring the frequency of response timeouts and delays between transmissions of requests and response times to detect network faults and congestion of traffic associated with connections from the gateway system to the IP network.

The gateway system has a function of receiving information on faults in an IP network from a gate keeper or a network manager or inquiring the same to acquire information on whether transmission of packets to each of nodes such as servers and a router that form the IP network is enabled or disabled, and detecting the state of a line for connecting the telephone network to the IP network.

The gateway system also has a function of detecting network faults associated with connections from the gateway system to an IP network by analyzing information of a notification of disabled routing to a particular route received from each of nodes such as a router that form an IP network.

Further, according to the invention, a gateway system which has detected network faults or congestion of traffic during connection to an IP network according to the above-described procedure has a function of notifying of a telephone network of the fact that the line interface to the telephone network has been disabled and instructing the telephone network to perform alternative routing to lines which have no problem in accessing the IP network instead of using the relevant group of lines as means for limiting connection to a device in the gateway system having a fault in order to establish interface with the IP network and for instructing alternative routing to another device.

According to the invention, there is also provided a function of detecting the fact that a fault has been eliminated after a notification of a disabled line to a telephone network and notifying the same of the fact that the use of the line has been enabled.

There is also provided a function of notifying a telephone network of the fact that the use of a line is disabled depending on the frequency of faults when fault detection is performed for each call and notifying of cancellation of disabled use. There is also provided a function of notifying of a telephone network of the fact that a part of the lines are disabled depending on the frequency of faults when fault detection is performed for each call, and monitoring the frequency of faults of incoming calls to the remaining lines to detect recovery from the faults, thereby notifying of the telephone network of cancellation of disabled use with utilizing a timer.

The gateway system and the telephone network described above supervise called numbers which can be routed to each device in the gateway system among the lines contained therein, and the gateway system is provided with a function of instructing the telephone network of the called number that allows alternative routing to a usable line to allow the telephone network to actively perform alternative routing. There is also provided a function of allowing alternative routing to a usable line for each call utilizing an alternative routing function using an SPC provided in the telephone network by instructing the telephone network of the fact the call can be alternatively routed.

DESCRIPTION OF THE PREFERRED EMBODIMENT

Figure 1:
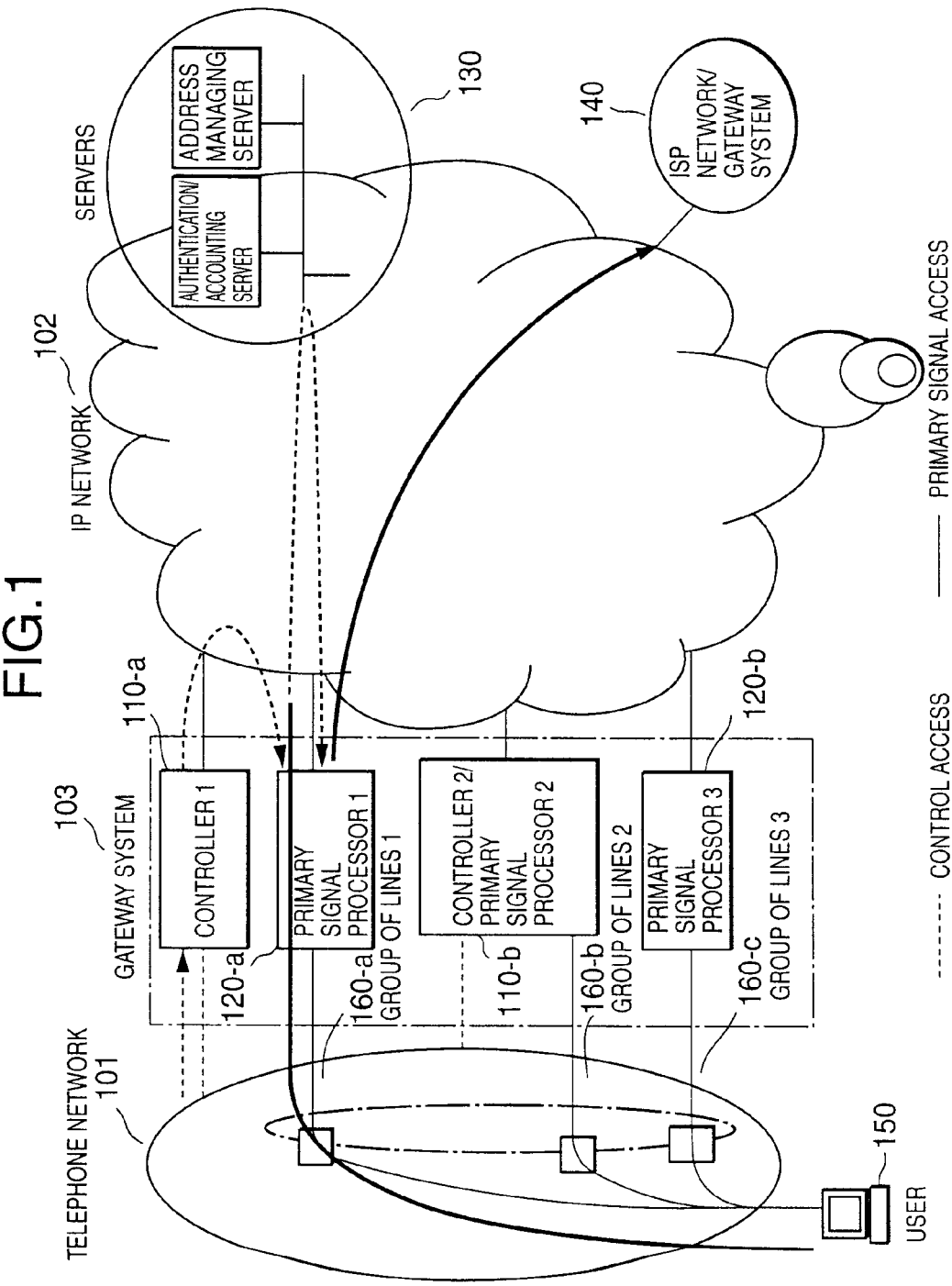
FIG. 1 is a diagram showing a configuration for internetwork connection between a telephone network and an IP network through a gateway system according to the invention and procedures for access from a primary signal processor of the gateway system to servers.
Figure 2:
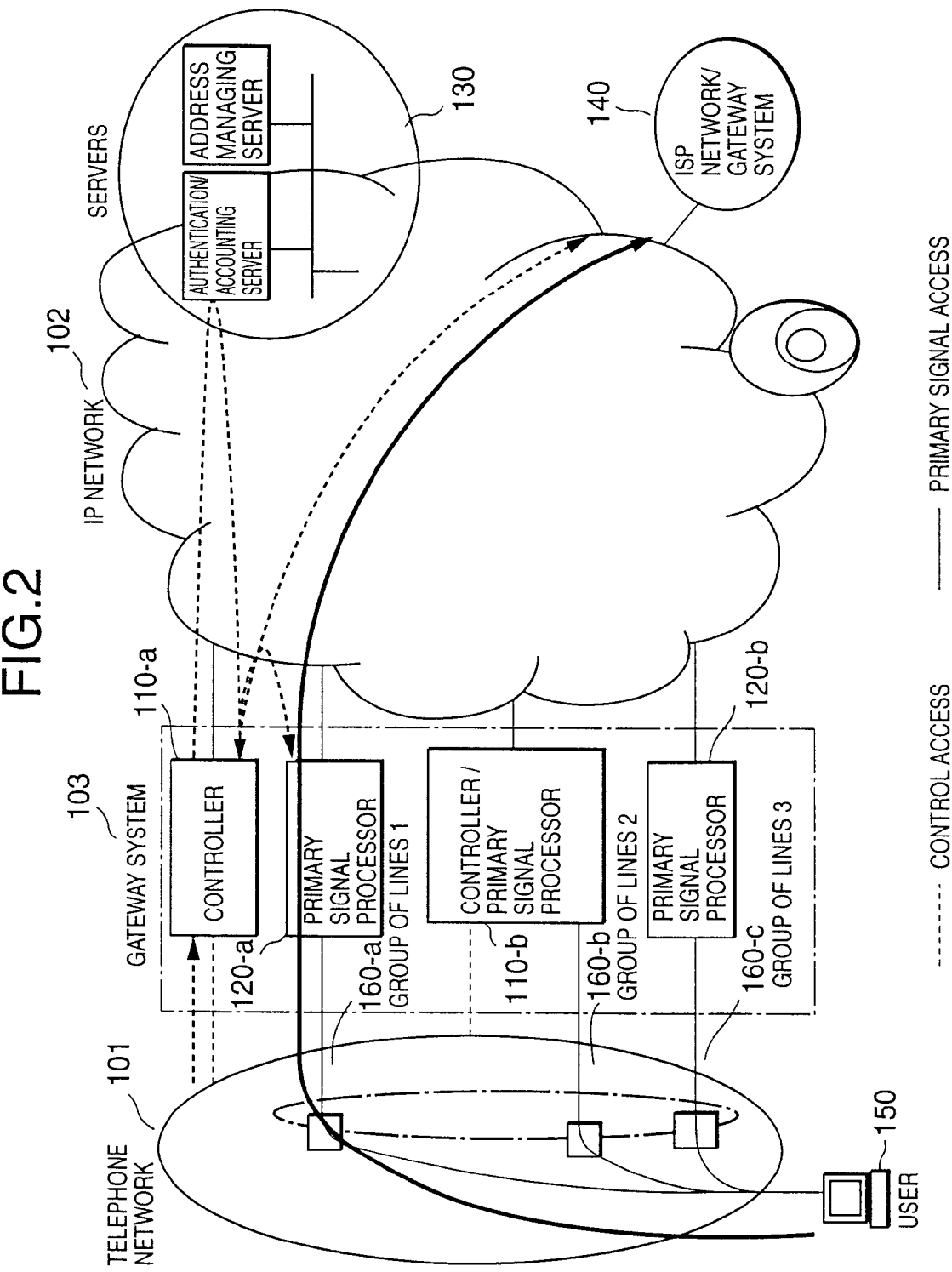
FIG. 2 is a diagram showing a configuration for internetwork connection between a telephone network and an IP network through a gateway system according to the invention and procedures for access from a primary signal processor of the gateway system to servers.

FIGS. 1 and 2 show an example of a configuration diagram of internetwork connection between a telephone network and an IP network through a gateway system according to the invention. Internetwork connection between a telephone network 101 and an IP network 102 is established through a gateway system 103 comprising controllers 110-*a* and 110-*b*, and stream controllers (primary signal processors) 120-*a* and 120-*b*.

The IP network is formed by the gateway system, a LAN including the gateway system, a LAN including a server, and an internet network.

The telephone network 101 and the controllers 110-*a* and 110-*b* are connected through a signal channel (D-channel) of a user/network interface of an ISDN or a common channel signaling #7 of an internetwork connection interface, and the telephone network 101 and the primary signal processors 120*a*, 120*b*, 110-*b* are connected through the B-channel, H0-channel and H1-channel of the ISDN or a line interface such as an SDH (Synchronous Digital Hierarchy), 2M TTC, T1 or E1. Control signals from the telephone network 101 cause the controllers 110-*a* and 110-*b* to perform a control process of call processing signals, and the call control processing at the primary signal processors 120-*a*, 120-*b* and 110-*b*. The controllers and the primary signal processors may be physically separated and, alternatively, a single apparatus may contain both of them like the controller 110-*b*. A single controller (110-*a*, 110-*b*) may control a plurality of primary signal processors such as the primary signal processor 120-*b* which are separately provided. FIG. 1 shows a case in which a user 150 places a call to groups of lines contained in the primary signal processors 1, 2 and 3 of the gateway system 103 with an incoming telephone number which is routed by the telephone network 101 and in which the call is routed to the lines contained in the primary signal processor 1 (120-*a*).

When a controller accepts a request for connection from the telephone network, either or both of the controller and a primary signal processor access authentication, accounting, and address management servers to perform acquisition of an access IP address, authentication of the user and the like and thereafter access an ISP network (internet service provider network) or another gateway system. For example, the RADIUS (Remote Authentication Dial In User Service) defined in the RFC2138 and RFC2139 is used as a procedure for accessing an authentication/accounting server. For example, the IPCP (Internet Protocol Control Protocol) defined in the IETF RFC1332 is used as means for acquiring an access IP address.

FIG. 1 shows an example in which the controller 1 (110-*a*) controls the primary signal processor 1 (120-*a*) such that the primary signal processor 1 (120-*a*) accesses servers 130 to perform control and accesses an ISP network and another gateway system 140 (hereinafter simply referred to as "ISP network") for a primary signal from the user who has placed a call. FIG. 2 shows an example in which the controller 110-*a* establishes a control access to the servers 130 to control the primary signal processor 120-*a* and establishes a control access to the ISP network 140 to establish an access for the primary signal from the primary signal processor 120-*a* to the ISP network 140.

Figure 3:
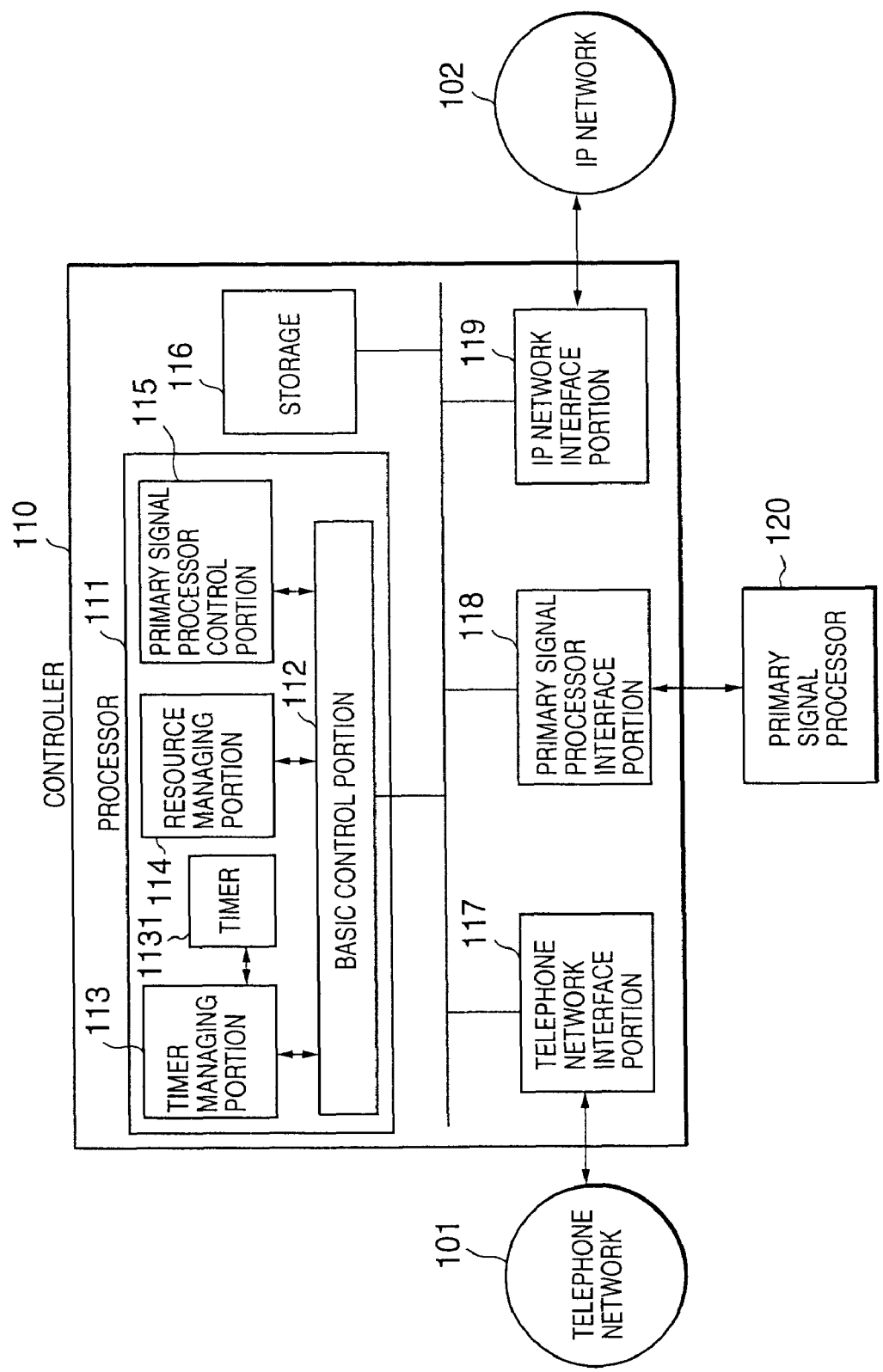
FIG. 3 is a diagram showing a configuration of a controller according to the invention.

FIG. 3 is a configuration diagram of a controller of a gateway system. A controller 110 is constituted by primary hardware components, e.g., a processor 111, a storage 116, a telephone network interface portion 117, an IP network interface portion 119 and a primary signal processor interface portion 118. When the controller is connected to a primary signal processor through an IP network, the IP network interface portion may also serve as a primary signal processor interface portion.

The processor 111 is primarily constituted by functional blocks, i.e., a basic control portion 112, a timer managing portion 113, a resource managing portion 114 and a primary signal processor control portion 115. The basic control portion 112 establishes interface with various devices and controls the execution of software or hardware in which the timer managing portion, resource managing portion and primary signal processor control portion are installed. The primary signal processor control portion 115 has algorithm for controlling the state of the primary signal processors, repeating signals from the telephone network, and performing communication with external apparatuses such as access to servers. The resource managing portion 114 has algorithm for the management of state of communication of the primary signal processors at the controllers and performs a function of referring to and updating a state management table in the storage 116. The timer managing portion 113 has algorithm for controlling a timer 1131 in the controllers to perform timer-monitoring of the state of the primary signal processors and blocking/alternative routing control. Modules that constitute the above functional blocks are stored in the memory storage and can be read into a memory of the processor apparatus to be operated when the processor executes the modules.

Figure 4:
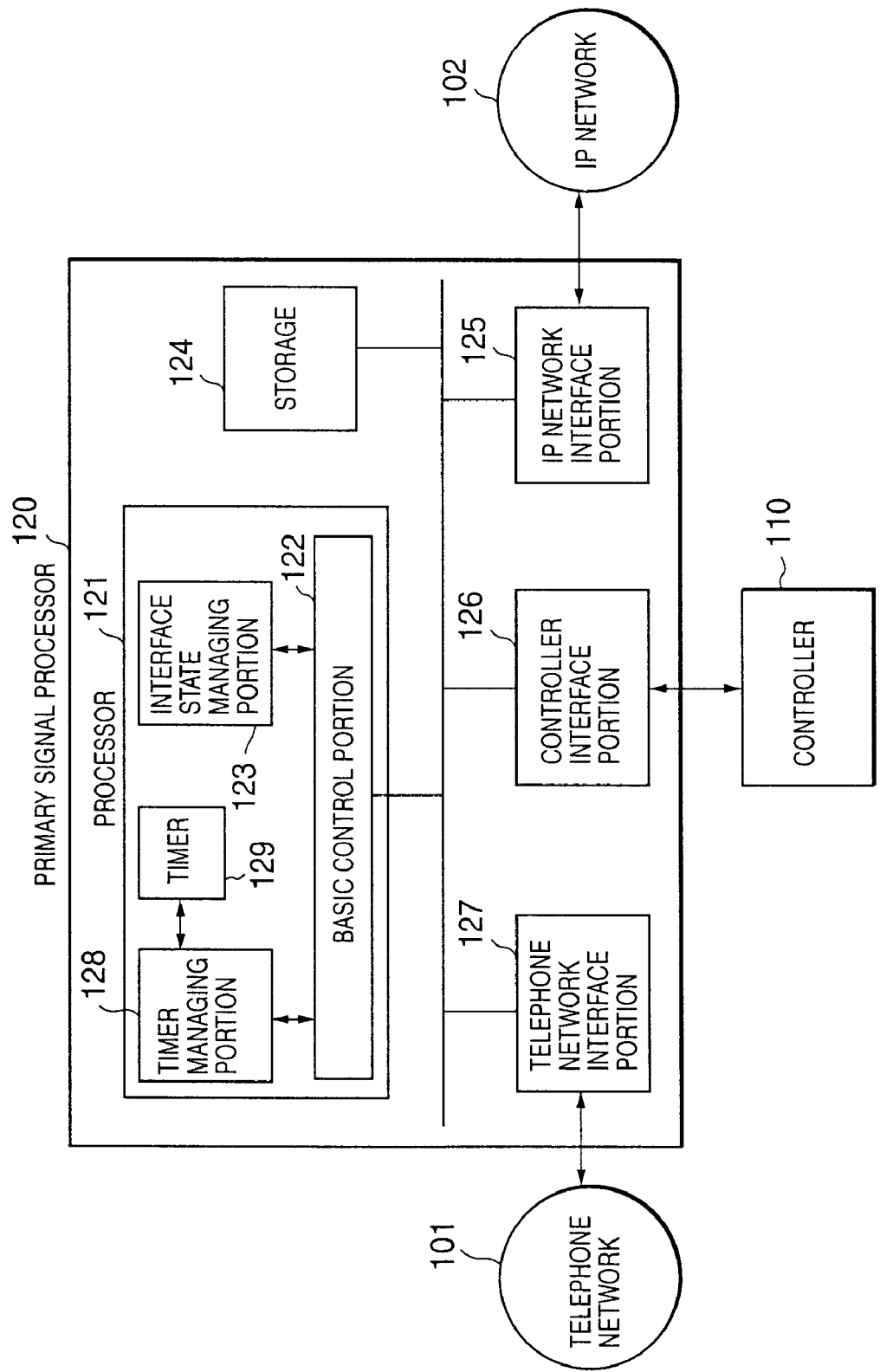
FIG. 4 is a diagram showing a configuration of a primary signal processor according to the invention.

FIG. 4 is a configuration diagram of a primary signal processor of the gateway system. A primary signal processor 120 is primarily constituted by hardware components, i.e., a processor 121, a storage 124, an IP network interface portion 125, a line interface portion 127 and a controller interface portion 126. When a controller is connected to the primary signal processor through the IP network, the IP network interface portion may serve also as a controller interface portion.

The processor 121 is primarily constituted by functional blocks, i.e., a basic control portion 122, an interface state managing portion 123, a timer 129 and a timer managing portion 128. The basic control portion 122 establishes interface with various devices and controls the execution of the interface state managing portion and timer managing portion. The interface state managing portion 123 has algorithm having function of referring to and updating a management table in the storage 124 based on control signals transmitted by the controller 110 to manage the state of a line/IP network interface in the primary signal processor. The timer managing portion 128 has algorithm for controlling a timer 129 in the primary signal processor to perform time-monitoring of response packets from the IP network interface. Modules that constitute the above functional blocks are stored in the memory storage and can be read into a memory of the processor apparatus to be operated when the processor apparatus executes the modules.

When there is a request for connection from the telephone network to the gateway system, upon receipt of a call control signal from the telephone network 101, the controller 110 performs access control over the primary signal processor 120 based on information in the call control signal. When the controller must access the servers such as the authentication/accounting server to control the primary signal processor, it accesses the servers through the IP network interface portion 119 of the controller. The primary signal processor opens paths at the telephone network interface and IP network interface based on a control signal transmitted by the controller to connect the user terminal and the IP network and to perform an interface conversion process between the telephone network and IP network. When the primary signal processor must access to the servers such as the authentication/accounting server to connect the user terminal to the IP network, user authentication is carried out using, for example, the RADIUS protocol.

Figure 5:
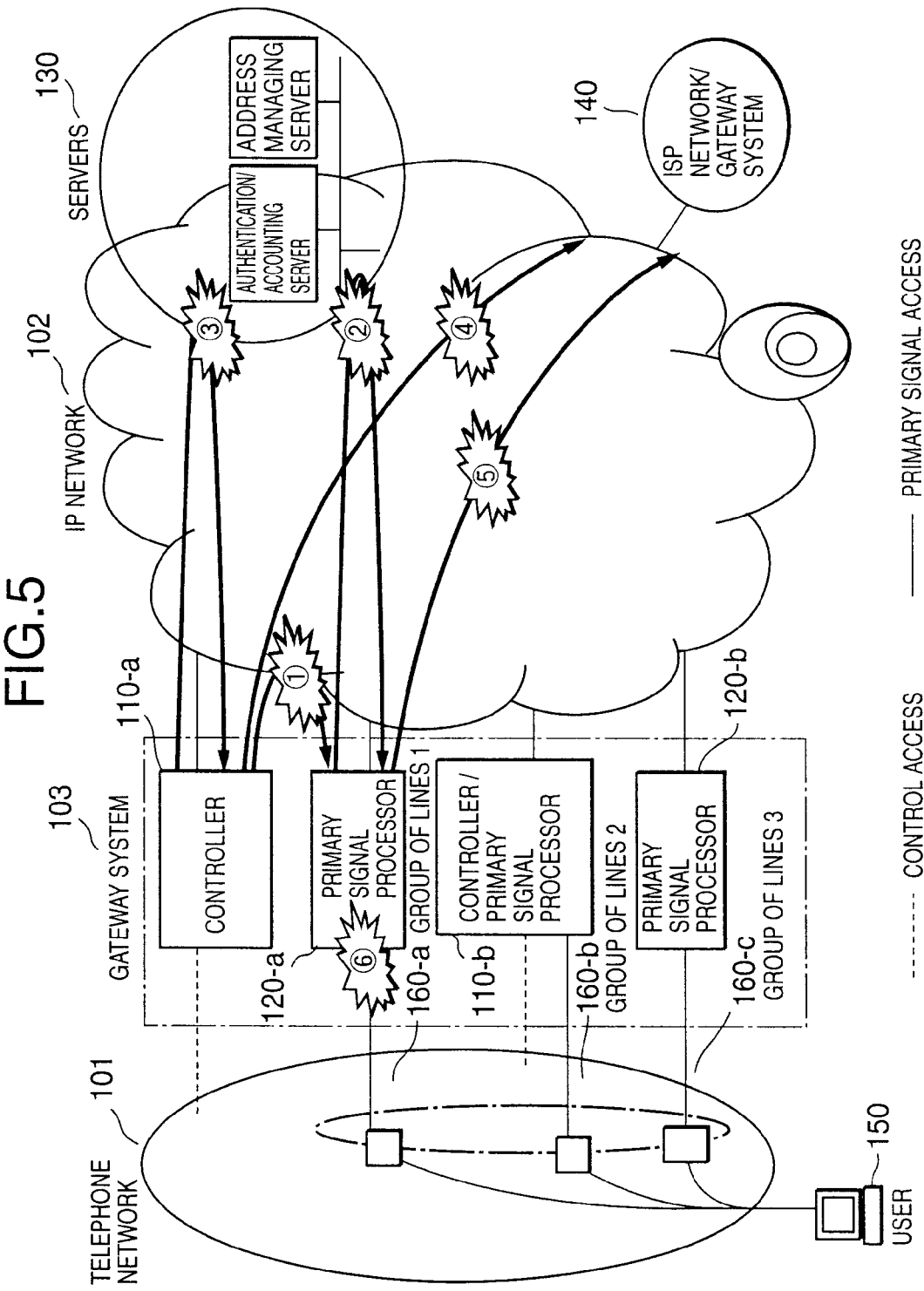
FIG. 5 is a diagram showing cases of faults at internetwork connection between a telephone line and an IP network through the gateway system according to the invention.

FIG. 5 shows several cases of a fault which triggers an instruction for alternative routing from the controller to the telephone network. A case 1 is a case in which there is a fault in a control access path from the controller to a single or a plurality of primary signal processors to be controlled. A case 1 is a case in which there is a fault in an access channel from the primary signal processor to the servers. A case 3 is a case in which there is a fault in an access channel from the controller to the servers. A case 4 is a case in which there is a fault in an access channel from the primary signal processor to the IPS network. A case 5 is a case in which there is a fault in an access channel from the primary signal processor to the IP network. A case 6 is a case in which there is a fault in the primary signal processor.

For the fault in any of the above cases 1 through 6, the method for instructing alternative routing from the gateway system to the telephone network can be changed depending on the location and time of the fault.

Figure 6:
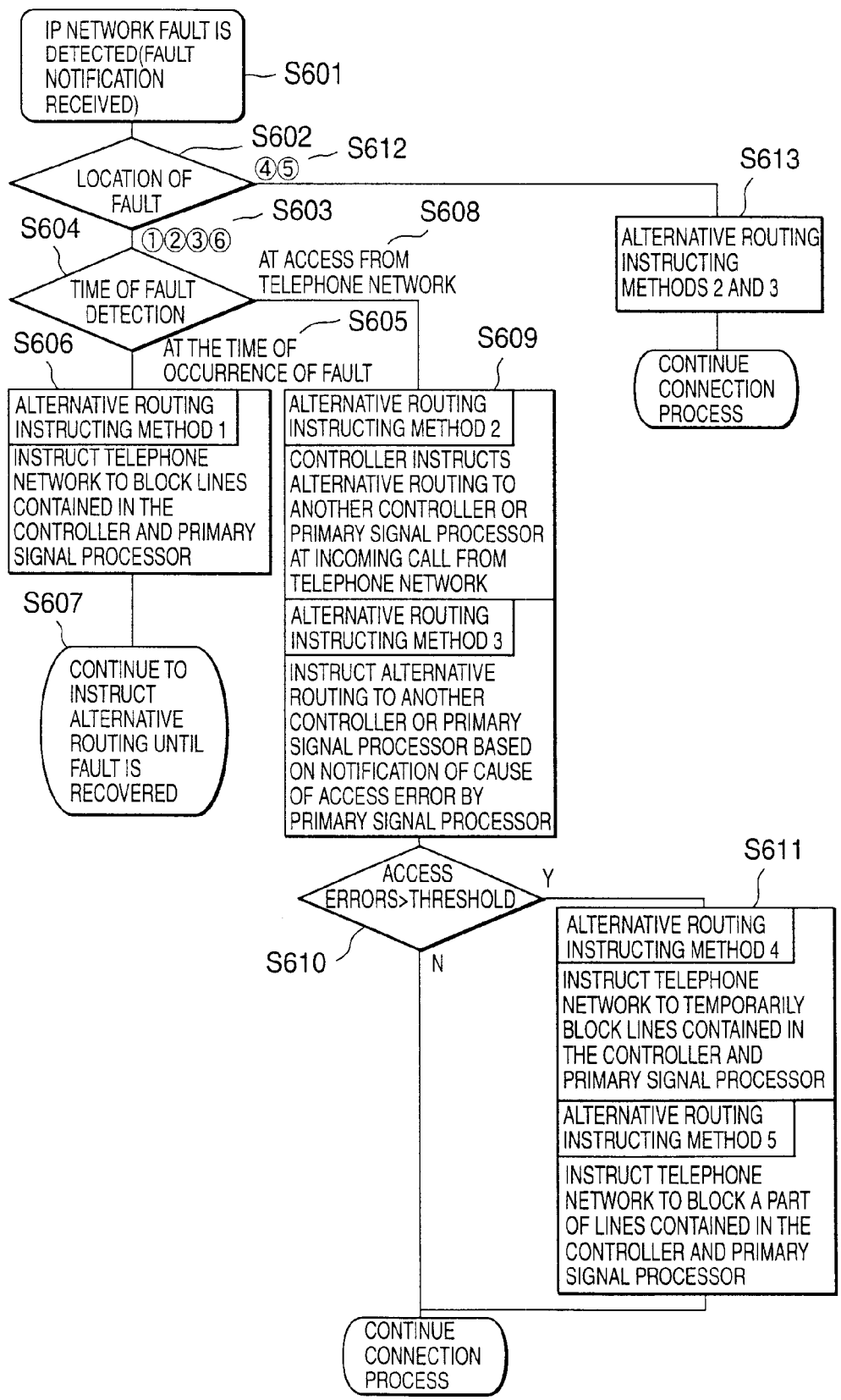
FIG. 6 is a diagram showing a flow of selection of methods for instructing alternative routing for the cases of faults at internetwork connection between a telephone line and an IP network through the gateway system according to the invention.

FIG. 6 shows an example of a flow of selection of a method for instructing the telephone network to perform alternative routing in case that the gateway system 103 detects a fault in the IP network or receives a notification of a fault from the servers 130 including a network manager.

When the gateway system detects a fault in the IP network or receives a notification of a fault from the servers 130 including a network manager (S601), it determines the location where the fault was detected (S602). In the case (1), (2), (3) or (6) (S603), it further determines the time of detection of the fault (S604). If the time of detection of the fault was the time of occurrence of the fault (S605), the gateway system determines that communication through the relevant controller 110 or primary signal processor has been disabled, and the controller instructs the telephone network to block the lines contained in the controller and primary signal processor (S606) to block the same lines until the recovery from the fault is detected (S607).

When the fault is detected at the time of access from the telephone network (S608), the gateway system instructs the telephone network to use alternative lines to another controller and primary signal processor which are operating properly using an alternative routing instructing method 2 or 3 to be described later each time an access error occurs for an incoming call from the telephone network (S609) and thereafter measures the frequency of access errors (S610).

When the access errors exceed a threshold set in advance in the controller and primary signal processor, the gateway system temporarily or partially blocks the lines contained in the controller and primary signal processor using timer-monitoring based on an alternative routing instructing method 4 or 5 to be described later (S611).

When the location of a fault is categorized as the case 4 or 5, the alternative routing instructing method 2 or 3 is used to determine accessibility of an incoming call from the telephone network to the relevant channel based on information such as the called number, IP address and domain name and, when it is determined that access to the channel is disabled, an instruction for alternative routing is given to the telephone network (S613).

The use of the above-described alternative routing instructing methods 1 through 5 allows the IP network to continue serving users even when a fault in the IP network is detected by a part of the gateway system while keeping the users unconscious of the fault.

Examples of measures to detect faults in the cases 1 through 6 will now be described.

According to a method 1 for detecting a fault in the case 1, the controller monitors internal resources provided therein such as a buffer for transmission to the primary signal processor to detect such a situation that packets are discarded because of an overflow of the internal resources attributable to disabled transmission of access request packets, thereby detecting the fact that a fault has occurred in an access in the case 1.

A method 2 for detecting a fault in the case 1 is a method in which the controller sets a timer when an access request packet is transmitted to the IP network and monitors the time spent before a response packet is received to detect any fault. The timer managing portion determines that a fault has occurred in an access in the case 1 when it frequently observes that a response packet does not arrive within the monitoring time or a response packet arrives with a significant delay.

A method 3 for detecting a fault in the case 1 is to detect the occurrence of a fault in the access channel to the primary signal processor based on a notification from a network manager in the IP network or an inquiry from the controller to the network manager. The network managing function may be provided in the servers, gateway system or the LAN in which the gateway system is contained. Possible simple methods include a method in which a fault is detected by the controller by periodically issuing an inquiry to a routing device in the IP network such as a router located in the primary signal processor or on the access channel to the primary signal processor using "ping", a packet in an upper layer or the like and a method in which a fault is detected by the controller by monitoring packets periodically transmitted by the routing device in the IP network such as a router located in the primary signal processor or the access channel thereto.

A method 4 for detecting a fault in the case 1 is a method in which a fault is detected by receiving a notification of disabled delivery transmitted by a device in the IP network in response to an IP packet transmitted by the controller. The controller instructs the telephone network to perform alternative routing using any of methods to be described later such that an incoming call to the primary signal processor which is uncontrollable because of a fault in the access channel in the case 1 detected using each of those method can be alternatively routed to another primary signal processor, which allows the network to serve users even if there is a fault in the case 1.

According to a method 1 for detecting a fault in the case 2, the primary signal processor monitors internal resources provided therein such as a buffer for transmission to the servers to detect such a situation that packets are discarded because of an overflow of the internal resources attributable to disabled transmission of access request packets, and the primary signal processor notifies the controller of the fact that it is unusable, thereby allowing detection of the fact that a fault has occurred in an access in the case 2. Upon receipt of the notification, the controller can detect the fact that the use of the primary signal processor has been disabled.

A method 2 for detecting a fault in the case 2 is a method in which the primary signal processor sets a timer when an access request packet is transmitted to the IP network, monitors the time spent before a response packet is received to detect any fault and notifies the controller of the fault. The timer managing portion determines that a fault has occurred in an access in the case 2 when it frequently observes that a response packet does not arrive within the monitoring time or a response packet arrives with a significant delay. This is notified from the primary signal processor to the controller and, upon receipt of the notification, the controller detects the fact that the use of the primary signal processor has been disabled.

A method 3 for detecting a fault in the case 2 is to detect the occurrence of a fault in the access channel from the primary signal processor to the servers based on a notification from a network manager in the IP network or an inquiry from the controller to the network manager. The network managing function may be provided in the gateway system or the LAN in which the gateway system is contained. The notification of a fault is provided to the primary signal processor and may thereafter be provided to the controller in the same manner as that in the methods 1 and 2 or provided to the controller directly. Possible simple methods include a method in which a fault is detected by the primary signal processor by periodically issuing an inquiry to a routing device in the IP network such as a router located in the servers or on the access channel to the servers using "ping", a packet in an upper layer or the like and a method in which a fault is detected by the primary signal processor by monitoring packets periodically transmitted by the routing device in the IP network such as a router located in the servers or the access channel thereto.

A method 4 for detecting a fault in the case 2 is a method in which a fault is detected by the primary signal processor by receiving a notification of disabled delivery transmitted by the routing device in the IP network in response to an IP packet transmitted by the primary signal processor and in which the primary signal processor notifies the controller of the fact.

The controller instructs the telephone network to perform alternative routing using any of the methods to be described later such that an incoming call to the primary signal processor which is uncontrollable because of a fault in the access channel in the case 2 detected using each of those method can be alternatively routed to another primary signal processor, which allows the network to serve users even if there is a fault in the case 2.

According to a method 1 for detecting a fault in the case 3, the controller monitors internal resources provided therein such as the buffer for transmission to the primary signal processor to detect such a situation that packets are discarded because of an overflow of the internal resources attributable to disabled transmission of access request packets, thereby detecting the fact that a fault has occurred in an access in the case 3.

A method 2 for detecting a fault in the case 3 is a method in which the controller sets the timer when an access request packet is transmitted to the IP network and monitors the time spent before a response packet is received to detect any fault. It is determined that a fault has occurred in an access in the case 3 when it is frequently observed that a response packet does not arrive within the monitoring time or a response packet arrives with a significant delay.

A method 3 for detecting a fault in the case 3 is to detect the occurrence of a fault in the access channel to the servers based on a notification from a network manager in the IP network or an inquiry from the controller to the network manager. The network managing function may be provided in the gateway system or the LAN in which the gateway system is contained. Possible simple approaches to implement the method 3 include a method in which a fault is detected by the controller by periodically issuing an inquiry to a routing device in the IP network such as a router located in the servers or on the access channel to the servers using "ping", a packet in an upper layer or the like and a method in which a fault is detected by the controller by monitoring packets periodically transmitted by the routing device in the IP network such as a router located in the servers or the access channel thereto.

A method 4 for detecting a fault in the case 3 is a method in which a fault is detected by receiving a notification of disabled delivery transmitted by a device in the IP network in response to an IP packet transmitted by the controller.

The controller detects the fact that it has been disabled from control over an incoming call from the telephone network because of a fault in the access channel in the case 3 detected using each of those methods and instructs the telephone network to perform alternative routing using any of the methods to be described later such that incoming calls to the single or plurality of primary signal processors to be controlled by the controller can be alternatively routed to another primary signal processor, which allows the network to serve users even if there is a fault in the case 3.

According to a method 1 for detecting a fault in the case 4, internal resources in the controller such as a buffer for transmission to an ISP network are monitored to detect such a situation that packets are discarded because of an overflow of the internal resources attributable to disabled transmission of access request packets to the ISP network, thereby allowing the detection of occurrence of a fault in an access in the case 4.

A method 2 for detecting a fault in the case 4 is a method in which the controller sets the timer when an access request packet is transmitted to the IP network to monitor the time spent before a response packet is received, thereby detecting a fault. It is determined that a fault has occurred in an access in the case 4 when it is frequently observed that a response packet does not arrive within the monitoring time or a response packet arrives with a significant delay.

A method 3 for detecting a fault in the case 4 is to detect the occurrence of a fault in the access channel to the ISP network based on a notification from a network manager in the IP network or an inquiry from the controller to the network manager. The network managing function may be provided in the servers, the gateway system or the LAN in which the gateway system is contained. Possible simple approaches to implement the method 3 include a method in which a fault is detected by the controller by periodically issuing an inquiry to a routing device in the IP network such as a router located in the ISP network or on the access channel to the ISP network using "ping", a packet in an upper layer or the like and a method in which a fault is detected by the controller by monitoring packets periodically transmitted by the routing device in the IP network such as a router located in the ISP network or the access channel thereto.

A method 4 for detecting a fault in the case 4 is a method in which a fault is detected by receiving a notification of disabled delivery transmitted by a device in the IP network in response to an IP packet transmitted by the controller.

The controller detects the fact that its access to the ISP network has been disabled because of a fault in the access channel in the case 4 detected using each of those methods for each IP address of the ISP network or each network address of an IP address or each address in a place higher than the network and carries out management accordingly. The controller instructs the telephone network to perform alternative routing using the any of the methods to be described later such that an incoming call to the unit address that utilizes the single or plurality of primary signal processors to be controlled by the controller can be alternatively routed to another primary signal processor, which allows the network to serve users even if there is a fault in the case 4.

According to a method 1 for detecting a fault in the case 5, internal resources in the primary signal processor such as a buffer for transmission to the ISP network are monitored to detect such a situation that packets are discarded because of an overflow of the internal resources attributable to disabled transmission of access request packets to the ISP network, and such a fact is notified to the controller to allow the detection of occurrence of a fault in an access in the case 5.

A method 2 for detecting a fault in the case 5 is a method in which the primary signal processor sets the timer when an access request packet is transmitted to the IP network to monitor the time spent before a response packet is received, thereby detecting a fault. It is determined that a fault has occurred in an access in the case 5 when it is frequently observed that a response packet does not arrive within the monitoring time or a response packet arrives with a significant delay, and the controller is notified of the fact.

A method 3 for detecting a fault in the case 5 is to detect the occurrence of a fault in the access channel to the ISP network based on a notification from a network manager in the IP network or an inquiry from the primary signal processor to the network manager and to notifies the controller of the fact. The notification from the network manager may be given to the controller directly.

The network managing function may be provided in the servers, the gateway system or the LAN in which the gateway system is contained. Possible simple approaches to implement the method 3 include a method in which a fault is detected by the primary signal processor by periodically issuing an inquiry to a routing device in the IP network such as a router located in the ISP network or on the access channel to the ISP network using "ping", a packet in an upper layer or the like and a method in which a fault is detected by the primary signal processor by monitoring packets periodically transmitted by the routing device in the IP network such as a router located in the ISP network or the access channel thereto.

A method 4 for detecting a fault in the case 5 is a method in which a fault is detected by receiving a notification of disabled delivery transmitted by a device in the IP network in response to an IP packet transmitted by the primary signal processor and in which the controller is notified of the fact.

The controller detects the fact that its access to the ISP network has been disabled because of a fault in the access channel in the case 5 detected using each of those methods for each IP address of the ISP network or each network address of an IP address or each address in a place higher than the network and carries out management accordingly. The controller instructs the telephone network to perform alternative routing using the any of the methods to be described later such that an incoming call to the IP address as a unit for management that utilizes the single or plurality of primary signal processors to be controlled by the controller can be alternatively routed to another primary signal processor, which allows the network to serve users even if there is a fault in the case 5.

Different methods are used to detect a fault in the case 6 depending on the part of the primary signal processor having the fault.

A fault that has occurred at the interface of the primary processor to the controller or in a primary device in the primary signal processor can be detected using any of the methods 1, 2 and 3 for the case 1. A fault that has occurred at the interface of the same to the servers can be detected using any of the methods 1, 2 and 3 for the case 2. A fault that has occurred at the interface of the same to the ISP network can be detected using any of the methods 1, 2 and 3 for the case 5. A fault that has occurred at the interface of the same to the telephone network can be detected by monitoring the device state in the primary signal processor and by notifying the controller when a line fault or device fault is detected.

When the controller detects a fault using any of the above-described methods for detecting a fault, it operates in accordance with the detection method to instruct the telephone network to perform alternative routing. When a fault is detected at the interface to the telephone network, it instructs the telephone network to alternatively route an incoming call associated with the line on which the fault was detected to the interface of the relevant signal processor to another telephone network or to another primary signal processor, which allows the network to serve users even if there is a fault in the case 6.

Embodiments of methods for instructing the telephone network to perform alternative routing will be described.

Figure 7:
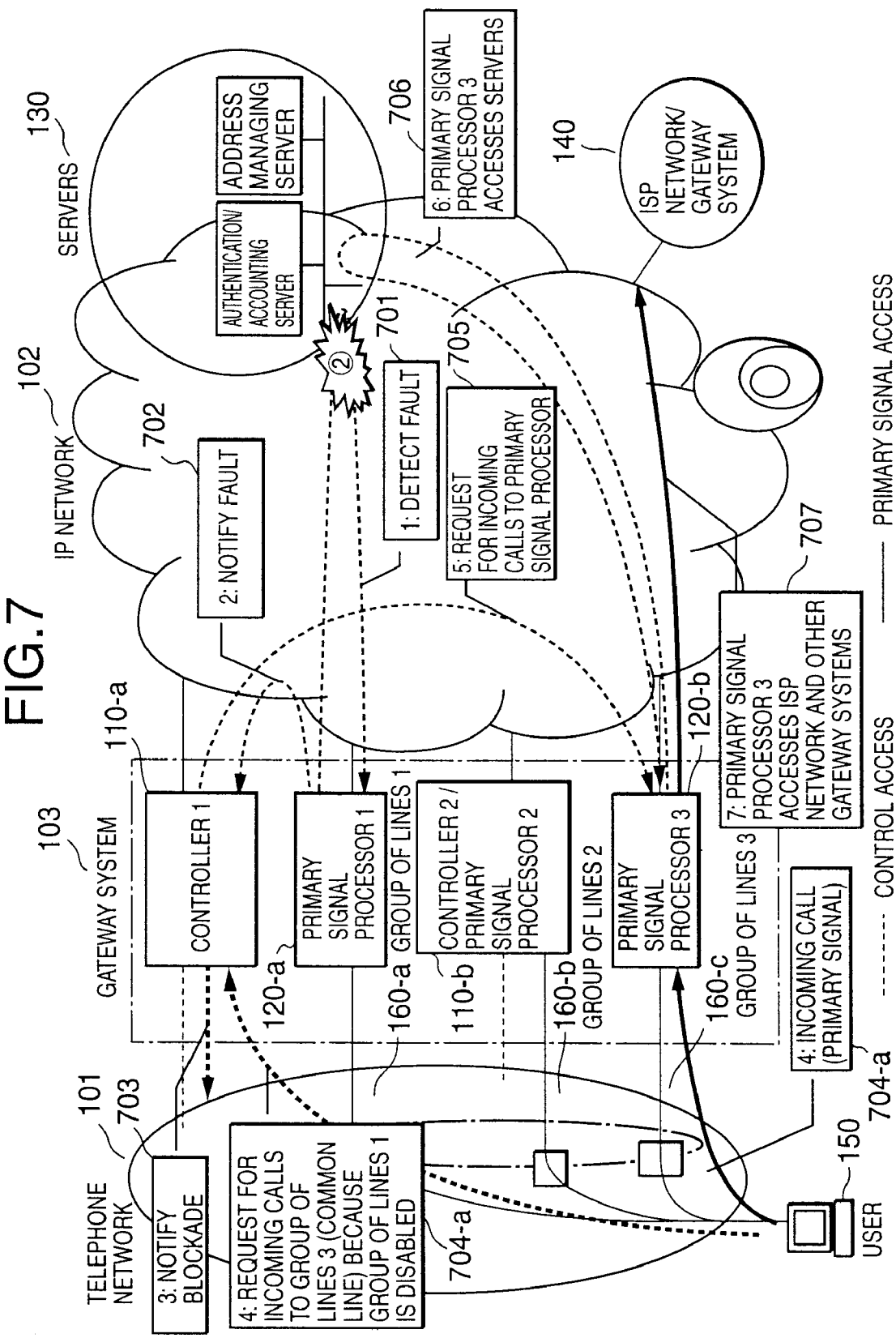
FIG. 7 is a diagram showing procedures according to the invention for detecting a fault in a case 2 using a method 3 and performing alternative routing according to an alternative routing instructing method 1.
Figure 8:
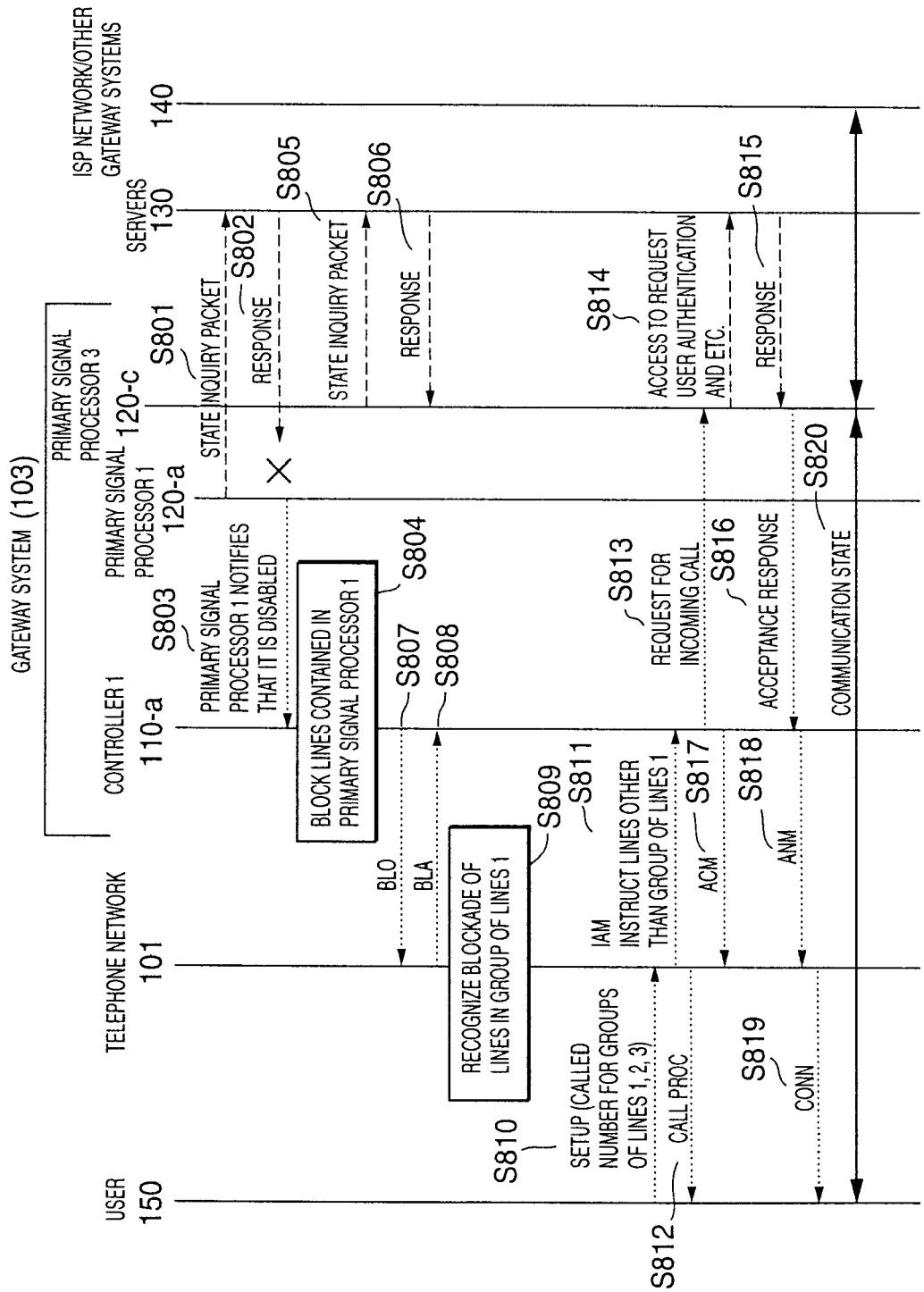
FIG. 8 is a diagram showing a sequence according to the invention for detecting a fault in the case 2 using the method 3 and performing alternative routing according to the alternative routing instructing method 1.

An example of an alternative routing instructing method 1 is shown in FIG. 7 which shows an example of procedures for the alternative routing instructing method 1 taken when a fault in the case 2 is detected using the method 3 and in FIG. 8 which shows an example of a sequence diagram for the same.

FIGS. 7 and 8 show an example in which the telephone network is instructed that lines are disabled using a blocking signal according to the ISUP of the ITU-T recommendation when the controller and the telephone network are connected by the common channel signaling #7.

The processor 121 of the primary signal processor 1 (120-*a*) detects a fault in the case 2 from the fact that no response packet (S802) to a state inquiry packet (S801) to the servers arrives (701) and notifies the controller 1 (110-*a*) of the fact that the use of the primary signal processor 1 is disabled (702, S803). The processor 111 and telephone network interface portion 117 of the controller 1 exchange ISUP blocking signals BL0 (S807) and BLA (S808) between the telephone network 101 to clock the group of lines 1 contained in the primary signal processor 1 (703, S804) The telephone network selects only groups of lines 2 and 3 as routing destinations among the groups of lines 1, 2 and 3 as possible routing destinations specified by a SETUP (S810) called number transmitted by the user 150 because the group of lines 1 (160-*a*) has been blocked by the controller 110-*a* (S809) (704-*a*, 704-*b*) and transmits CAL PROC to the user (S812) and IAM to the controller 1 to notify the selection of the incoming groups of lines 2 and 3 (S811). This allows the network to continue serving the user while keeping the user unconscious of the fault in the case 2.

The controller 1 performs an call acceptance process with the primary signal processor 3 (120-*b*) which has been selected as the routing destination (705, S813 through S816) and transmits ACM (S817) and ANM (S818) to the telephone network to notify it of the fact that connection to the IP network has been established. The telephone network transmits CONN to the user (S819), establishes an alternative connection and enters a communication state (S820).

Next, the primary signal processor 3 verifies the connection between the user and the ISP network with the servers 706 and, if a normal response is received, interconnection is established between the user and the ISP network through the primary signal processor 3 (707).

In the case of a fault in the case 3, since none of the primary signal processors controlled by the relevant controller is usable, a control link for the common line may be put in a disabled state at a link level or physical level to achieve the sane effect.

In a case wherein the gateway system and the telephone network are connected by an ISDN subscriber line and wherein lines incompatible with the D-channel are contained in another ISDN line, the same effect can be achieved by notifying of the telephone network of the fact that the layer 1 capabilities have been lost by, for example, sending neither layer 1 signal nor electrical signal in accordance with the ITU-T recommendations I.430 and I.431. In the case of a fault in the case 3 when the gateway system and the telephone network are connected through an ISDN subscriber line, since none of the primary signal processor controlled by the relevant controller is usable, a control link for the D-channel may be put in a disabled state at the link level or physical level to achieve the sane effect.

Figure 9:
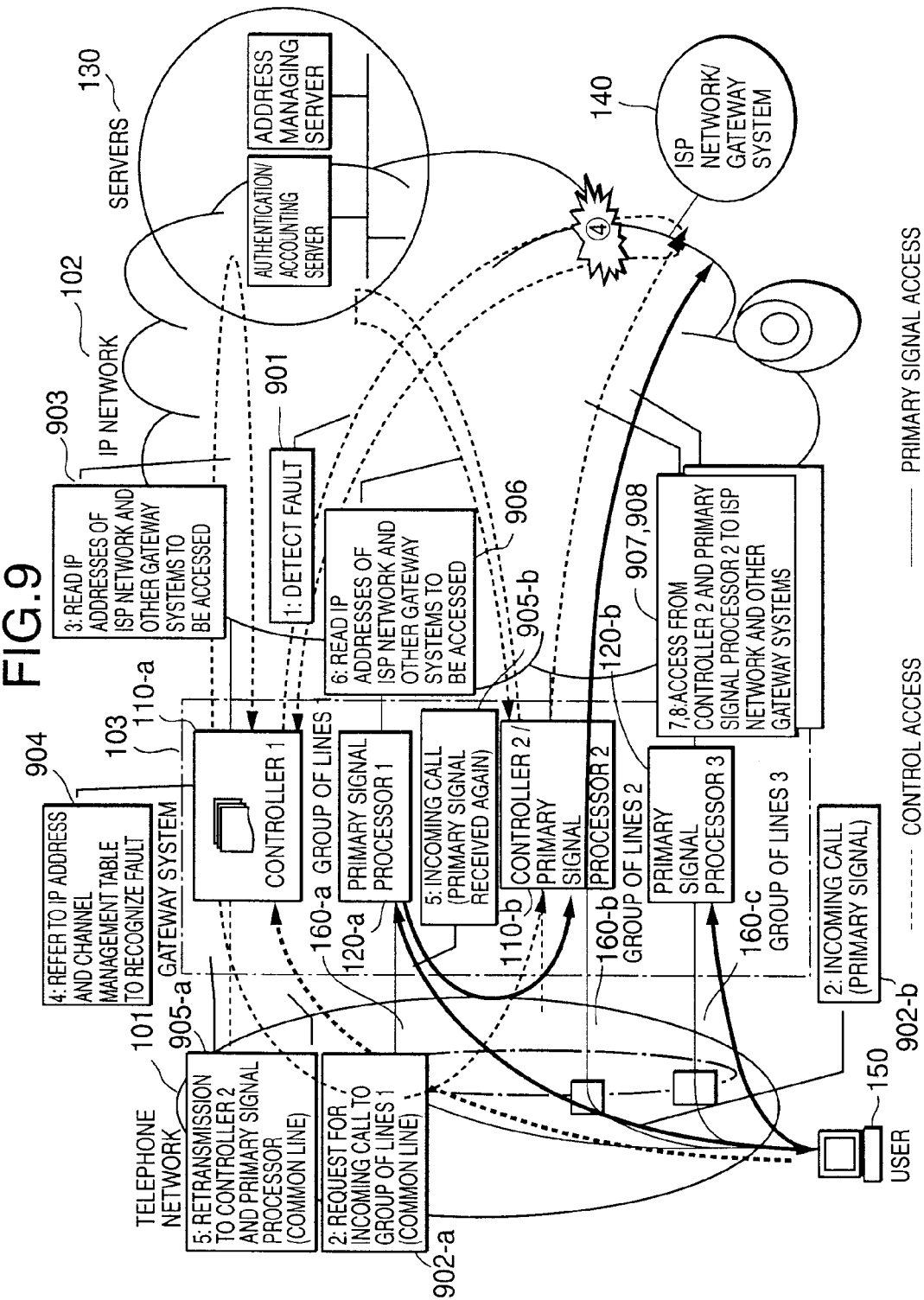
FIG. 9 is a diagram showing procedures according to the invention for detecting a fault in a case 4 using the method 3 and performing alternative routing according to an alternative routing instructing method 2.
Figure 10:
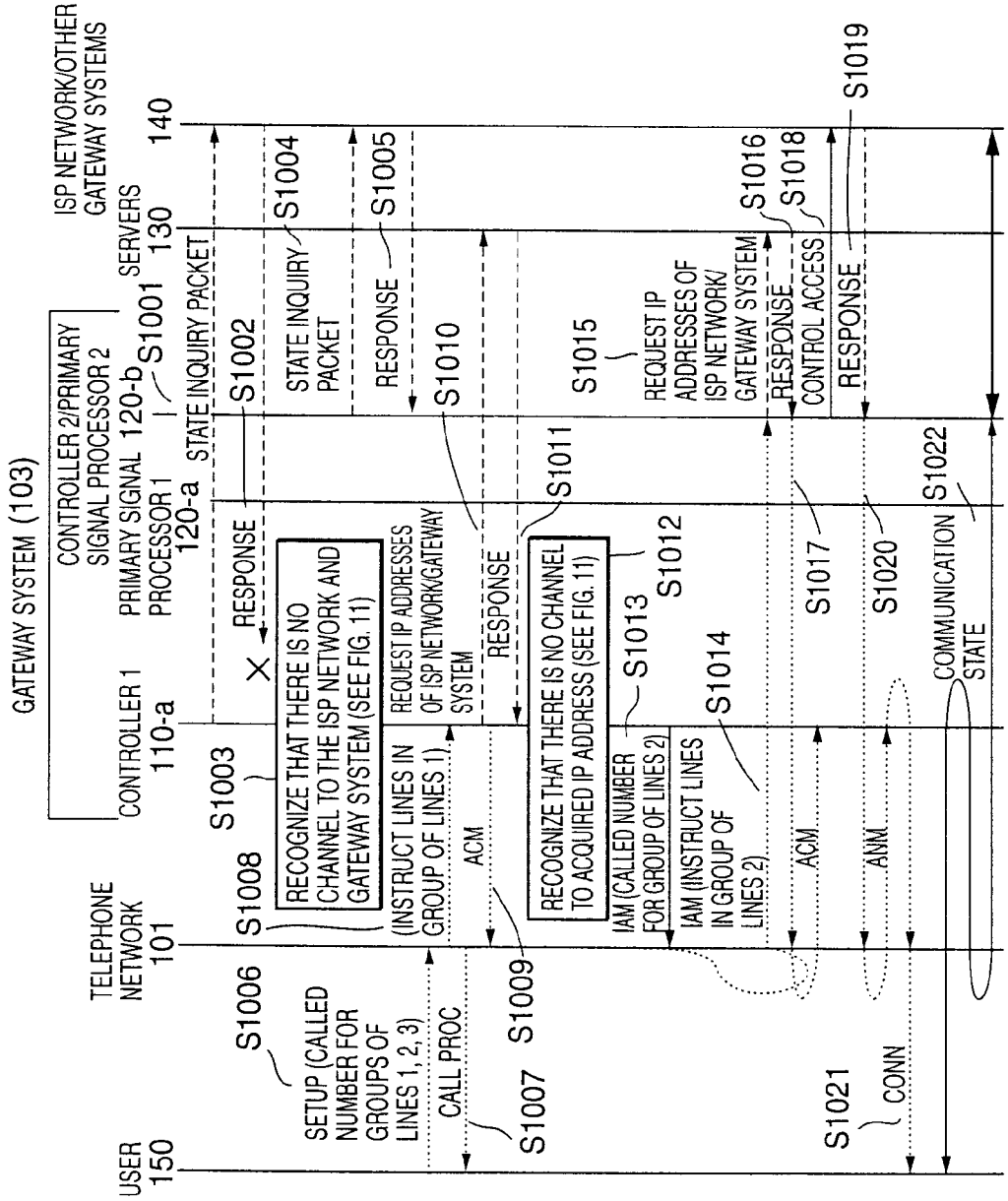
FIG. 10 is a diagram showing a sequence according to the invention for detecting a fault in the case 4 using the method 3 and performing alternative routing according to the alternative routing instructing method 2.
Figure 11:
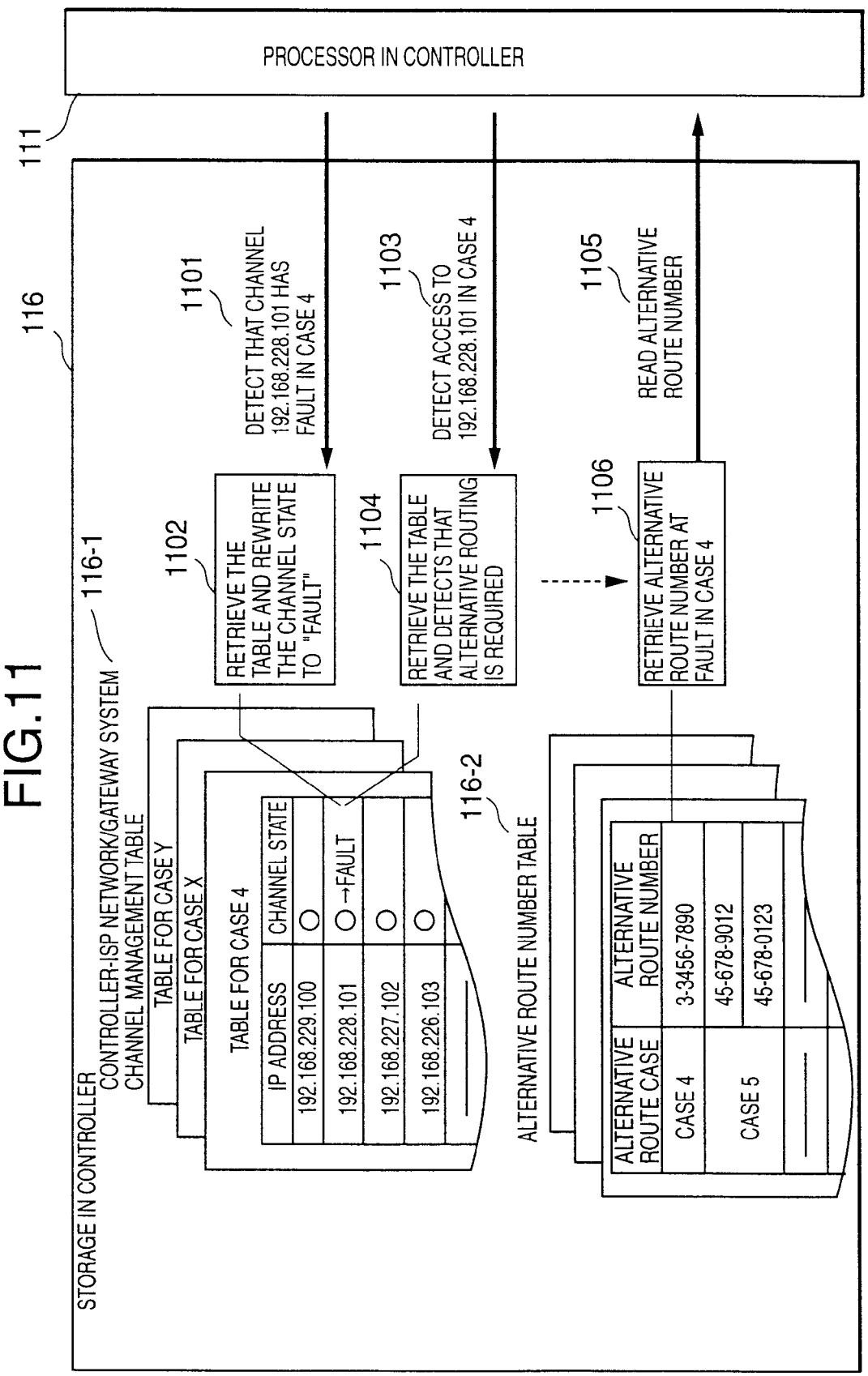
FIG. 11 is a diagram showing procedures according to the invention taken in a device for detecting a fault in the case 4 using the method 3.

An example of an alternative routing instructing method 2 is shown in FIG. 9 which shows an example of procedures for the alternative routing instructing method 2 taken when a fault in the case 4 is detected using the method 3, in FIG. 10 which shows an example of a sequence diagram for the same, and in FIG. 11 which shows an example of the setting of tables.

Figure 12:
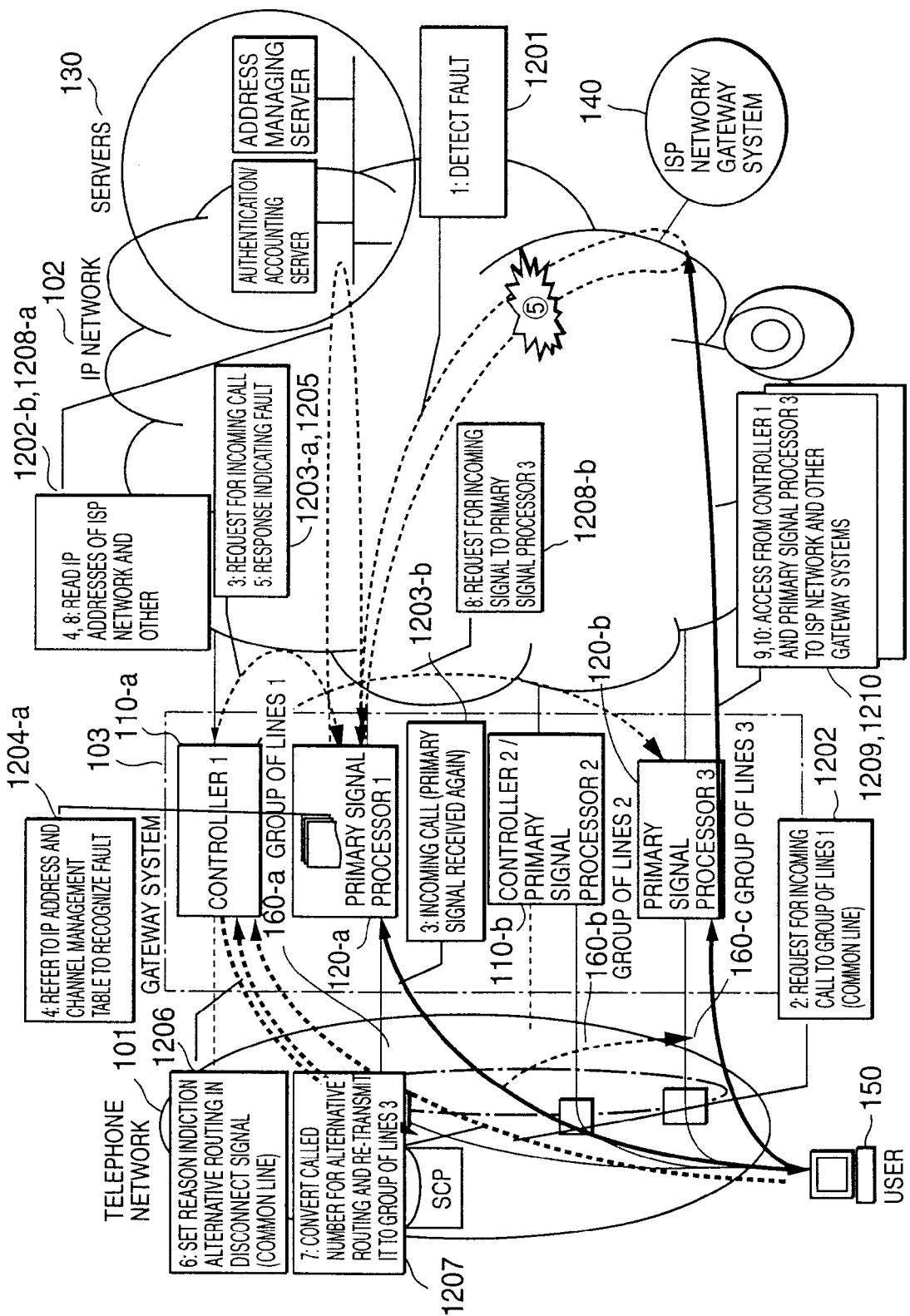
FIG. 12 is a diagram showing procedures according to the invention for detecting a fault in a case 5 using the method 3 and performing alternative routing according to an alternative routing instructing method 3.
Figure 13:
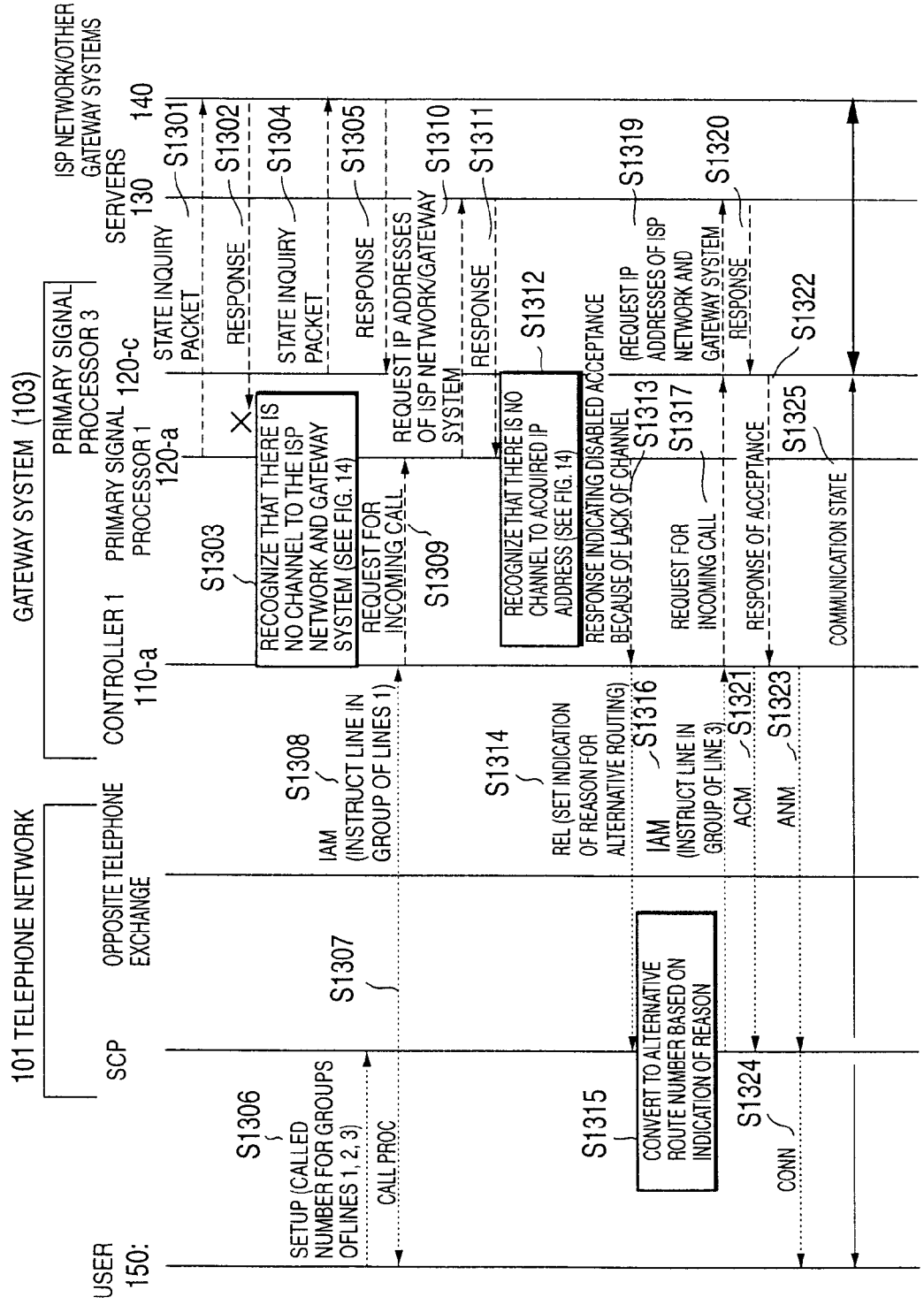
FIG. 13 is a diagram showing a sequence according to the invention for detecting a fault in the case 5 using the method 3 and performing alternative routing according to the alternative routing instructing method 3.
Figure 14:
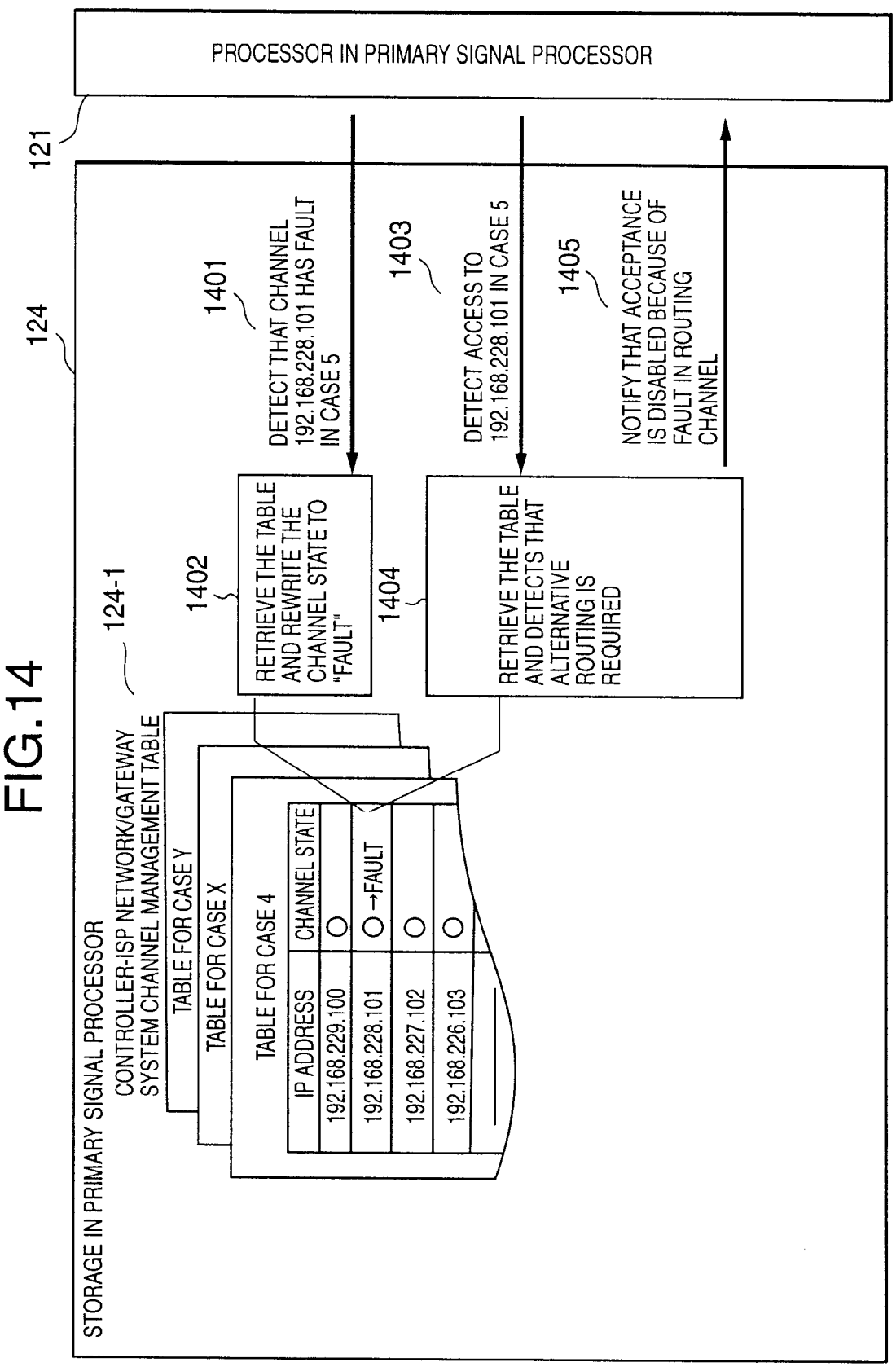
FIG. 14 is a diagram showing procedures according to the invention taken in a device for detecting a fault in the case 5 using the method 3.

An example of an alternative routing instructing method 3 is shown in FIG. 12 which shows an example of procedures for the alternative routing instructing method 3 taken when a fault in the case 5 is detected using the method 3, in FIG. 13 which shows an example of a sequence diagram for the same, and in FIG. 14 which shows an example of the setting of tables.

Faults detected using the method 3 for cases 4 and 5 are faults which can be detected by the controller when they occur. However, since those faults depend on the line associated with the relevant controller and primary signal processor and the IP addresses under management or high-order address units of the IP addresses, an instruction for alternative routing must be given to the telephone network for each call. Therefore, the controller or primary signal processor has a table of the IP addresses or the high-order address units of the IP addresses in the storage (116, 124) of the controller or primary signal processor and instructs alternative routing only when an IP address to the ISP network coincides with the channel having a fault which is managed by the same.

In FIGS. 9, 10 and 11, the controller and telephone network are connected by the common channel signaling #7, and the telephone line has a single or a plurality of called numbers provided by a translator which can be routed only to respective one of the groups of lines 1, 2 and 3 in addition to a single or a plurality of called numbers to be commonly routed to the groups of lines 1, 2 and 3. An example will now be shown on an instruction for alternative routing made by performing re-transmission to an called number which can be routed to another controller and primary signal processor when a fault in the case 4 is detected using the method 3 in such a situation.

From the fact that no response packet (S1002) arrives in response to a state inquiry packet (S1001) sent to the ISP network or another gateway system 140, the processor 111 of the controller 1 (110-a) recognizes the fact that a fault in the case 4 has disabled the channel to the relevant ISP network and gateway system 901 and rewrites the line state in a channel management table 116-1 in the storage 116 of the controller to "fault" (S1003). Next, when the telephone network 101 issues a request for connection to the controller 1 (902-a, 902-b, S1006 through S1009), the processor of the controller requests the servers to acquire the IP address information of the destination of the connection from called number information (903, S1010, S1011). The controller 1 recognizes that there is no channel to the IP address by referring to a channel management table in the storage of the controller using the acquired IP address 904, acquires an alternative route number for a fault in the case 4 by referring to an alternative route number management table 116-2 in itself (S1012) and notifies the telephone network of the alternative route number (S1013). Upon receipt of the alternative route number, the telephone network issues a request for connection to the controller 2 which is the alternative route (905, S1014). When the controller 2 and primary signal processor 2 establish proper access to the servers, the: ISP network and other gateways (906, S1015, S1016, S1018, S1019), the telephone network is connected (S1017, S1020, S1021); communication is established between the user 150 and the ISP network (S1022); and connection is established between the user 150 and the ISP and the other gateway systems through the controller 2 and primary signal processor 2 (907, 908).

FIG. 11 shows an example of a method for referring to and updating a table when a fault in the case 4 is detected on a channel having an IP address 192.168.228.101.

When the storage 116 in the controller receives a notification of the fact that there is a fault on the channel 192.168.228.101 in the case 4 from the processor in the controller 1101, an ISP network/gateway system channel management table 116-1 is retrieved, and the channel state of the field 192.168.228.101 is rewritten to "fault" (1102).

Next, when the processor 111 in the controller 110 accesses the channel 192.168.228.101 in the case 4 (1103), the above-mentioned table in the storage 116 is retrieved to detect that alternative routing is required because of a fault in the channel 192.168.228.101 (1104), and the alternative route number management table is retrieved (1106) to read an alternative route number 3-3456-7890 in the case 4 (110).

A pivot procedure according to the ITU recommendations and TTC specification may be activated as a method for allowing the gateway system to instruct the telephone line to perform alternative routing with the same effect. When the controller and the telephone network are connected through an ISDN subscriber line, the same effect can be achieved by activating a procedure for transferring an incoming call to the alternative route number.

FIGS. 12, 13 and 14 show a method in which the telephone network is equipped with an SCP and in which a fault in the case 3 is detected using the method 3 and a disconnect signal having a particular disconnecting factor is transmitted the telephone network to perform alternative routing to an alternative route number under which is managed by the SCP.

From the fact that no response packet (S1302) arrives in response to a state inquiry packet (S1301) sent to the ISP network or another gateway system 140, the processor 121 of the primary signal processor 1 (120-a) recognizes the fact that a fault in the case 5 has disabled the channel to the relevant ISP network and gateway system (1201) and rewrites the line state in a channel management table 124-1 in the storage 124 of the primary signal processor to read "fault" (S1303).

Next, when the telephone network 101 issues a request for connection to the controller 1 and the primary signal processor 1 through the SCP (1202, S1306 through S1309), the processor of the primary signal processor 1 requests the servers to acquire the IP address information of the destination of the connection from called number information (1203, S1310, S1311). The primary signal processor 1 recognizes that there is no channel to the IP address by referring to the channel management table in the storage of the controller using the acquired IP address (1204, S1312) and returns a response indicating disabled acceptance because of the lack of a channel to the controller 1 (1205, S1313). The controller 1 transmits REL in which an indication of the reason for alternative routing is set to the telephone network (1206, S1314). The SCP of the telephone network converts the called number to an alternative route number based on the received indication of the reason (S1316). The call is accepted by the primary signal processor 3 which is the alternative route (1207, S1316, S1317), and connection to the servers, ISP network and other gateways is established through the primary signal processor 3 (0.1208 through 1210, S1319 through S1325).

FIG. 14 shows an example of a method for referring to and updating a table when a fault in the case 5 is detected on the channel having the IP address 192.168.228.101.

When the storage 124 in the primary signal processor receives a notification of the fact that there is a fault on the channel 192.168.228.101 in the case 5 from the processor in the primary signal processor (1401), an ISP network/gateway system channel management table 124-1 is retrieved, and the channel state of the field 192.168.228.101 is rewritten to read "fault" (1402).

Next, when the processor in the primary signal processor accesses the channel 192.168.228.101 in the case 5 (1403), the above-mentioned table in the storage is retrieved to detect that alternative routing is required because of a fault in the channel 192.168.228.101 (1404), and a notification is made of the fact that an incoming call can not be accepted because of a fault in the routing channel (1405).

This method (alternative routing instructing method 3) can provide the same effect whether the controller and the telephone network are connected through the common channel signaling #7 or an ISDN.

Faults detected using the methods 1, 2 and 4 for the cases 1, 2, 3, 4 and 5 are detected at each access as a result of occurrence of an incoming call from the telephone network instead of being detected when they occur. Since an instruction for alternative routing is effective when it is given for each call, the alternative routing instructing methods 2 and 3 may be used.

Figure 15:
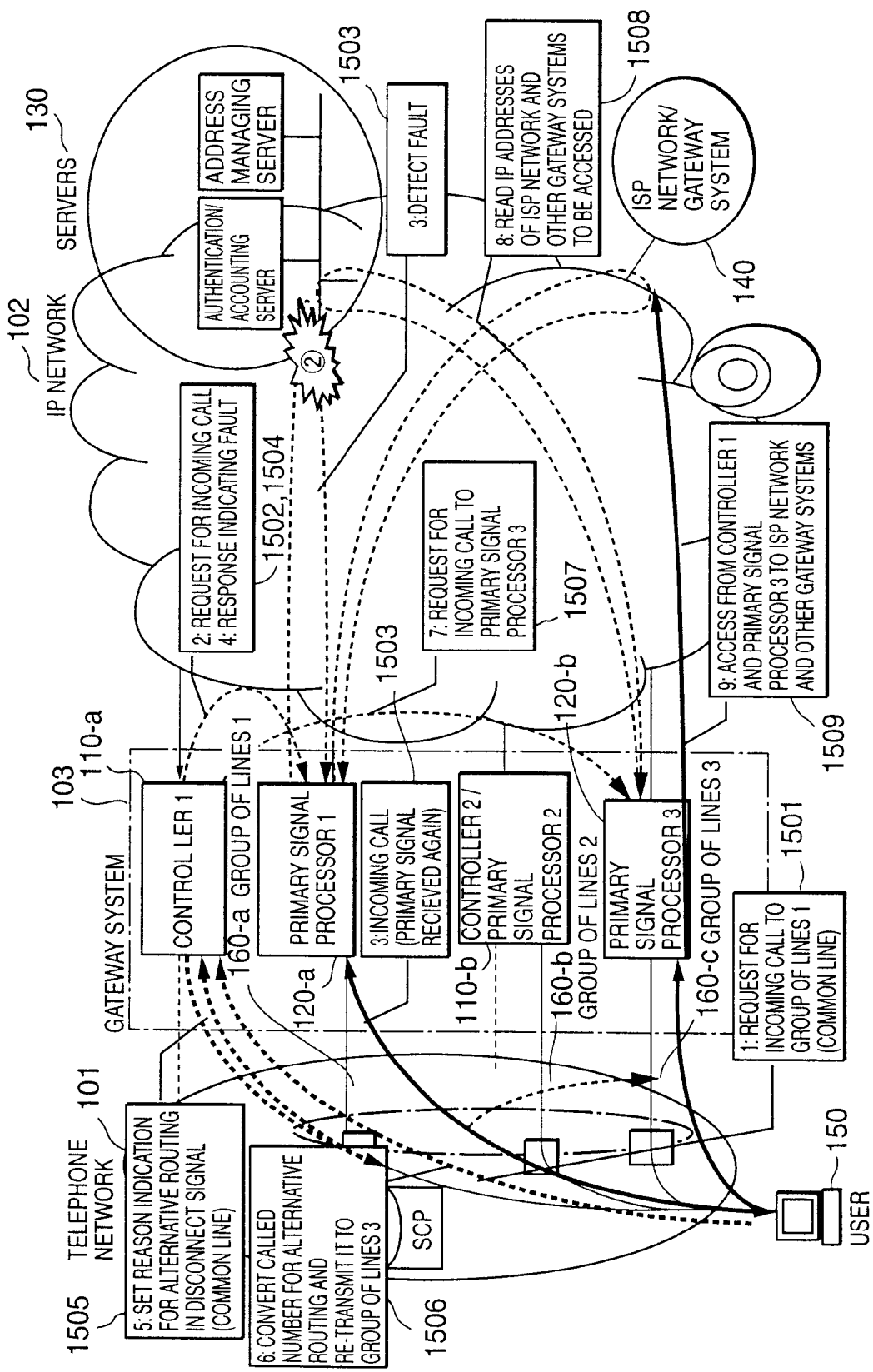
FIG. 15 is a diagram showing procedures according to the invention for detecting a fault in the case 2 using a method 2 and performing alternative routing according to the alternative routing instructing method 3.
Figure 16:
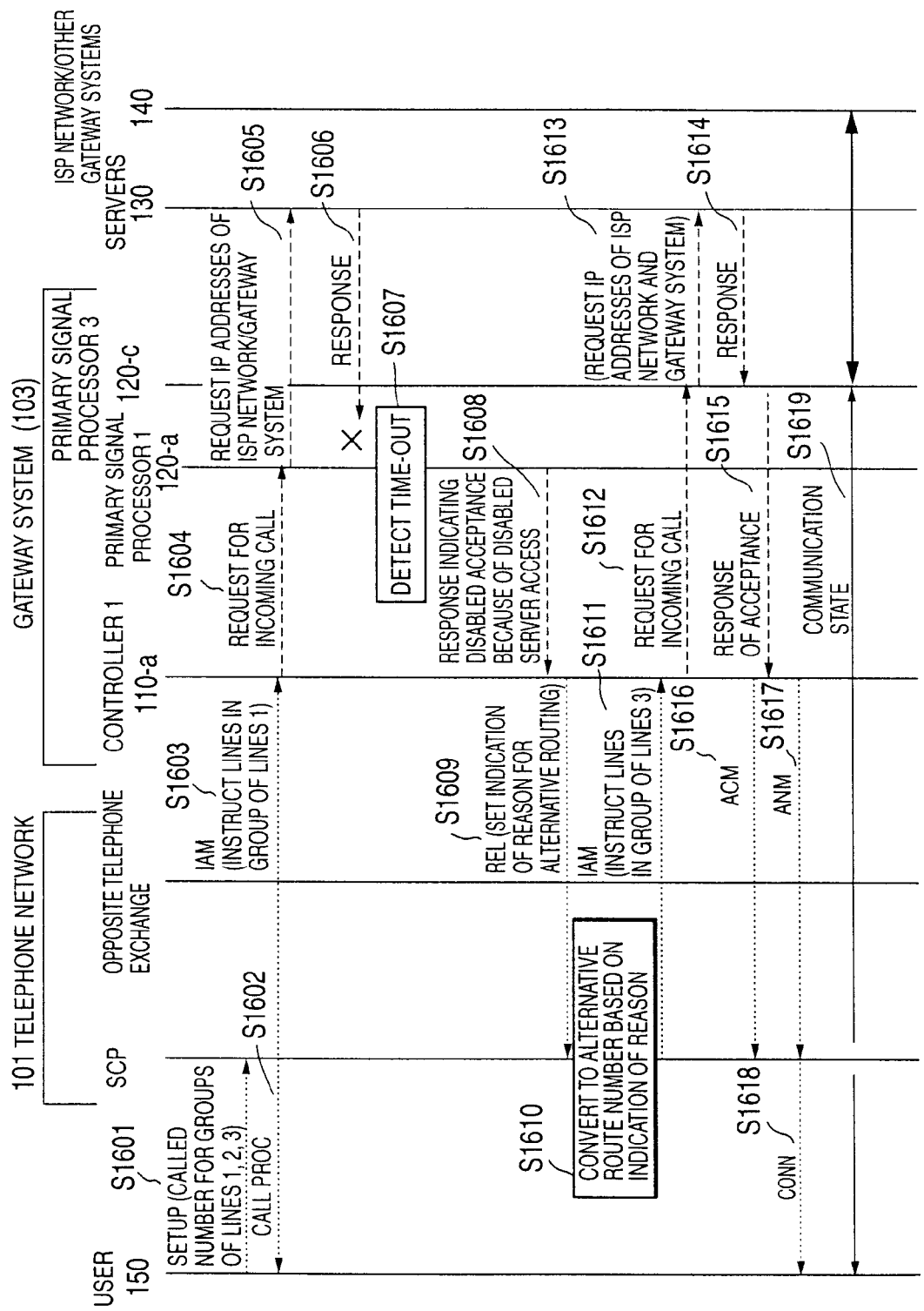
FIG. 16 is a diagram showing a sequence according to the invention for detecting a fault in the case 2 using the method 2 and performing alternative routing according to the alternative routing instructing method 3.

FIG. 15 shows an example of procedures taken when a fault is detected using the method 2 for the case 2 the alternative routing instructing method 3 is used in an instance where the controller and the telephone network are connected through the common channel signaling #7, and FIG. 16 shows an example of a sequence diagram therefor.

In this case, an incoming call is placed by the telephone network 101 to the controller **1 (110-*a*) and the primary signal processor 1 (120-*a*) (1501, 1502, 1601 through S1604); a fault in the case 2 is detected from a time-out for a response to a request for acquisition of an IP address in the IP network (S1605) issued from the processor 121 of the primary signal processor (1503, S1607); a response indicating disabled acceptance because of disabled server access is returned to the controller 1 from the primary signal processor (1504, S1608); and the controller 1 returns REL in which an indication of the reason for alternative routing is set to the telephone network (1505, S1609). Thereafter, the same procedures as those in FIG. 13 are taken to establish an alternative connection to the primary signal processor 3 (1506 through 1509, S1610 through S1619)**.

While faults detected using the methods 1, 2 and 4 for the cases 1, 2 and 3 are faults which are detected at each call as described above, the causes of the faults themselves may be consistent causes such as a problem in a router. Therefore, the controller may measure the frequency at which faults are detected using a counter provided for detecting faults in each of the cases or methods and, when the measurement exceeds a preset threshold, the alternative routing instructing method 1 may be used based on a judgement that the faults are consistent faults. In the above-described case, since the cause of the fault does not reside in the controller and primary signal processor themselves, a measure must be taken to detect recovery from the fault and to cancel the instruction for alternative routing. A possible measure to instruct alternative routing and to cancel the instruction for alternative routing is to set a fault monitoring timer for a channel which is determined as having a consistent fault, to instruct alternative routing during the timer is working and to cancel the instruction for alternative routing when the timer times up.

Figure 17:
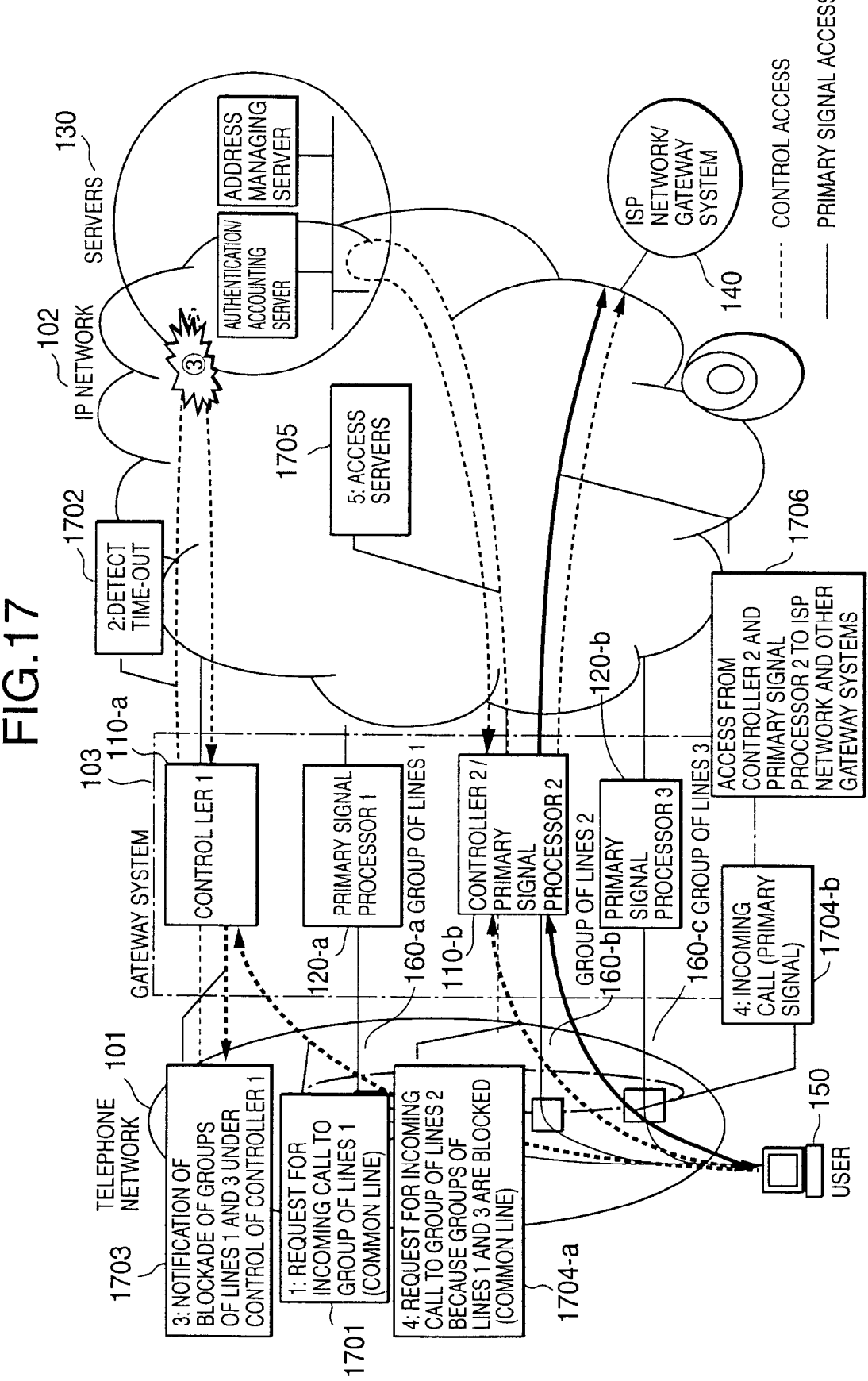
FIG. 17 is a diagram showing procedures according to the invention for detecting a fault in a case 3 using the method 2 and performing alternative routing according to an alternative routing instructing method 4.
Figure 18:
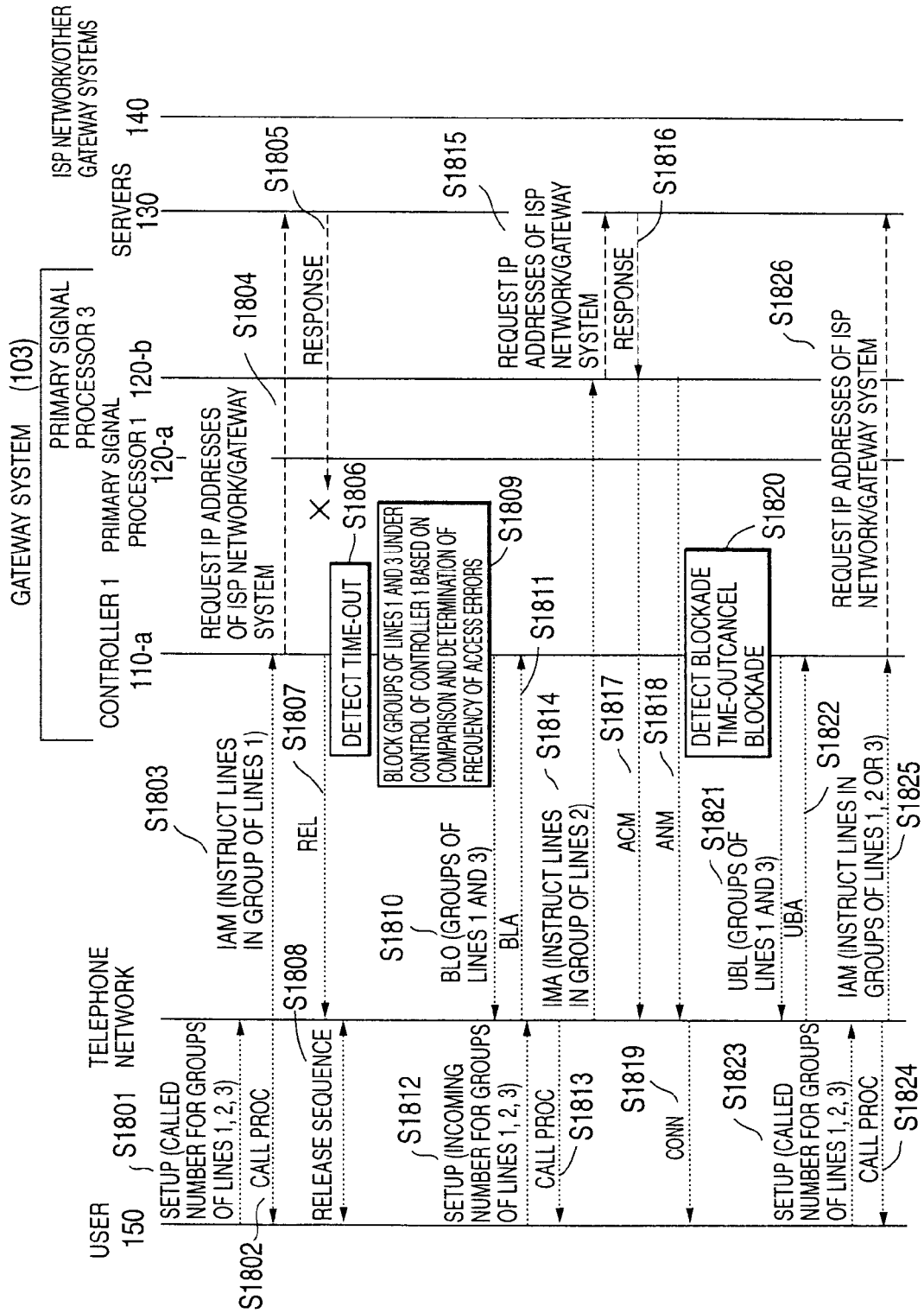
FIG. 18 is a diagram showing a sequence according to the invention for detecting a fault in the case 3 using the method 2 and performing alternative routing according to the alternative routing instructing method 4.
Figure 19:
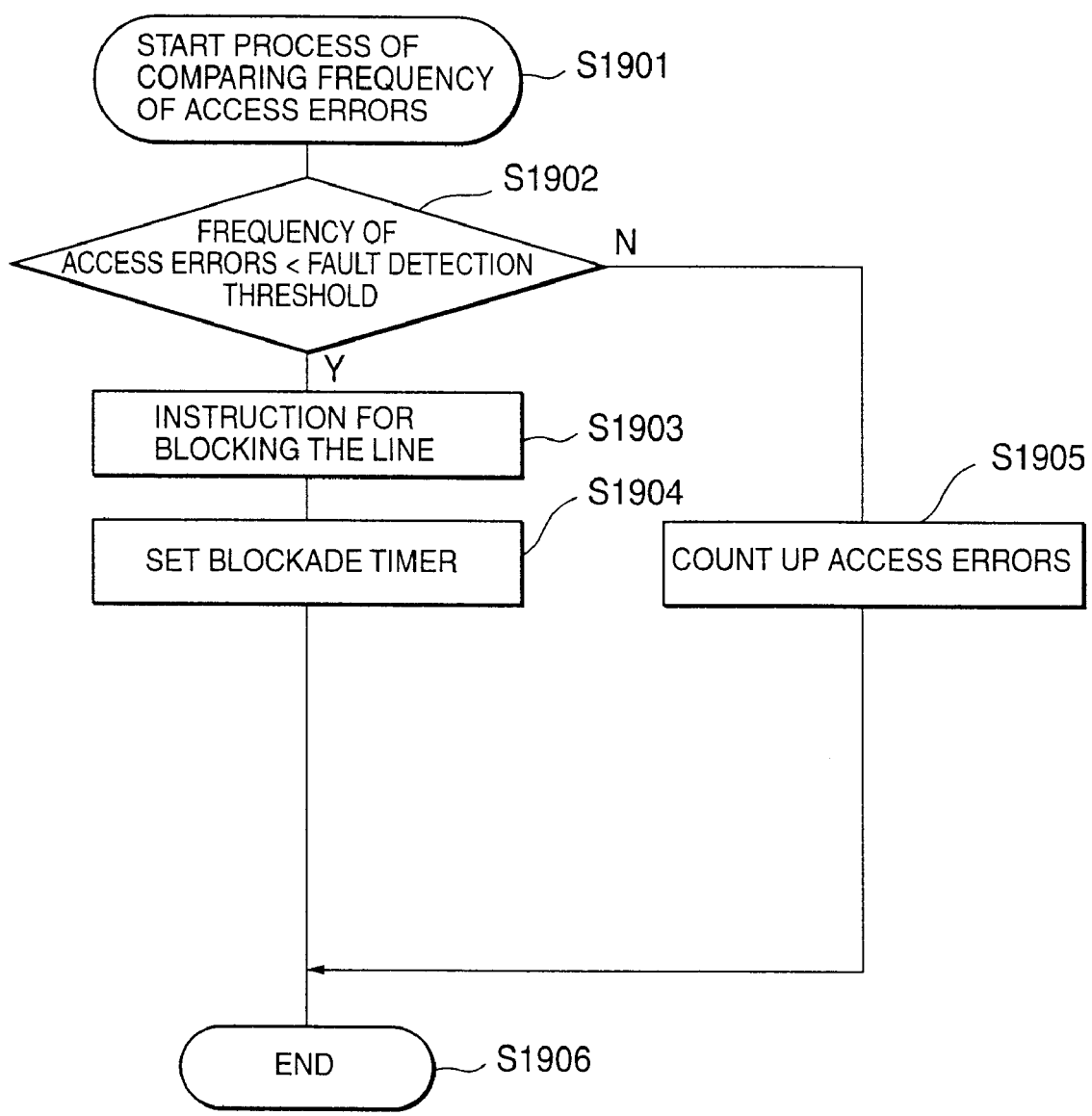
FIG. 19 is a diagram showing a flow according to the invention for detecting a fault in the case 3 using the method 2 and performing alternative routing according to the alternative routing instructing method 4.

This method is now called alternative routing instructing method 4. FIG. 17 shows an example of instruction and cancellation of alternative routing in which a fault is detected using the method 2 for the case 3 when the controller and the telephone network are connected through the common channel signaling #7; the telephone network is instructed to block the line according to the alternative routing instructing method 1; a fault monitoring timer is activated by the timer managing portion 113 in the controller for the relevant channel; and the blockade is canceled when the timer times up. FIG. 18 shows an example of a sequence diagram therefor, and FIG. 19 shows an example of a flow thereof.

The processor 111 of the controller **1 (110-*a*) starts comparison and determination of the frequency of accesses errors after a call is disconnected (S1807, S1808) as a result of the detection of a fault in the case 3 from a time-out of a request for acquisition of an IP address in the IP network issued to the servers 130 in response to an incoming call 1701 from the user 150 based on the called number thereof (1702, S1805). When access errors exceed a fault threshold (S1809, S1903), the processor 111 instructs the telephone network to block the lines of the groups of lines 1 and 3 which are managed by the controller 1 (1703, S1810, S1811) and activates a blockade monitoring timer (S1904). When the frequency of access errors is below the threshold, an access error counter counts up (S1905). While the groups of lines 1 and 3 are blocked, incoming calls are accepted over the group of lines 2 (1704), and the telephone network and the IP network are connected through the controller 2 and primary signal processor 2 (110**-*b*) (1705, 1706, S1812 through S1819).

Next, the processor in the controller 1 cancel the blockage of the groups of lines 1 and 3 at the time-out of the blockade monitoring timer (S1820 through S1822), which allows incoming calls to the groups of lines 1 through 3 to be restored (S1823 through S1826).

Figure 20:
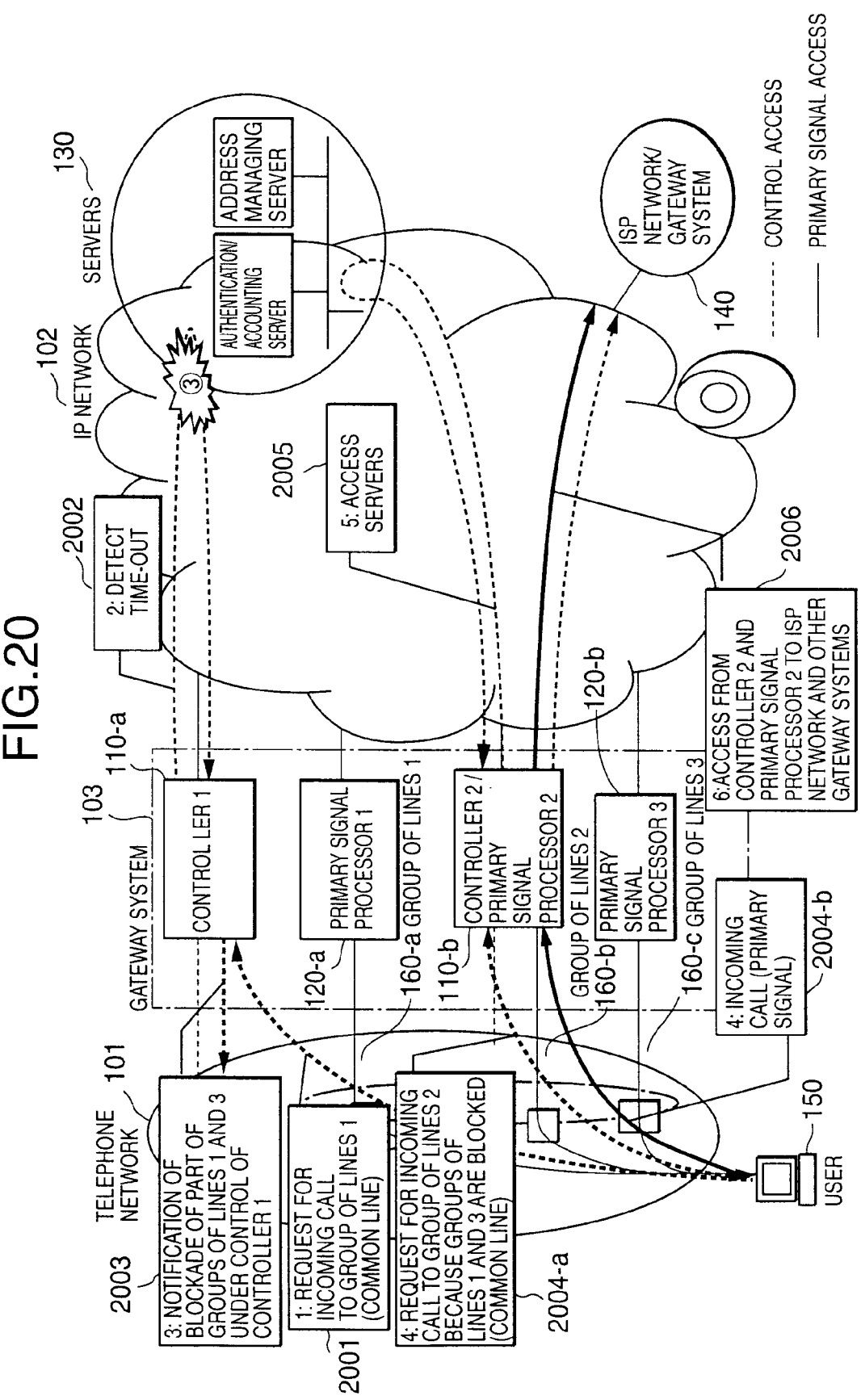
FIG. 20 is a diagram showing procedures according to the invention for detecting a fault in the case 3 using the method 2 and performing alternative routing according to an alternative routing instructing method 5.
Figure 21:
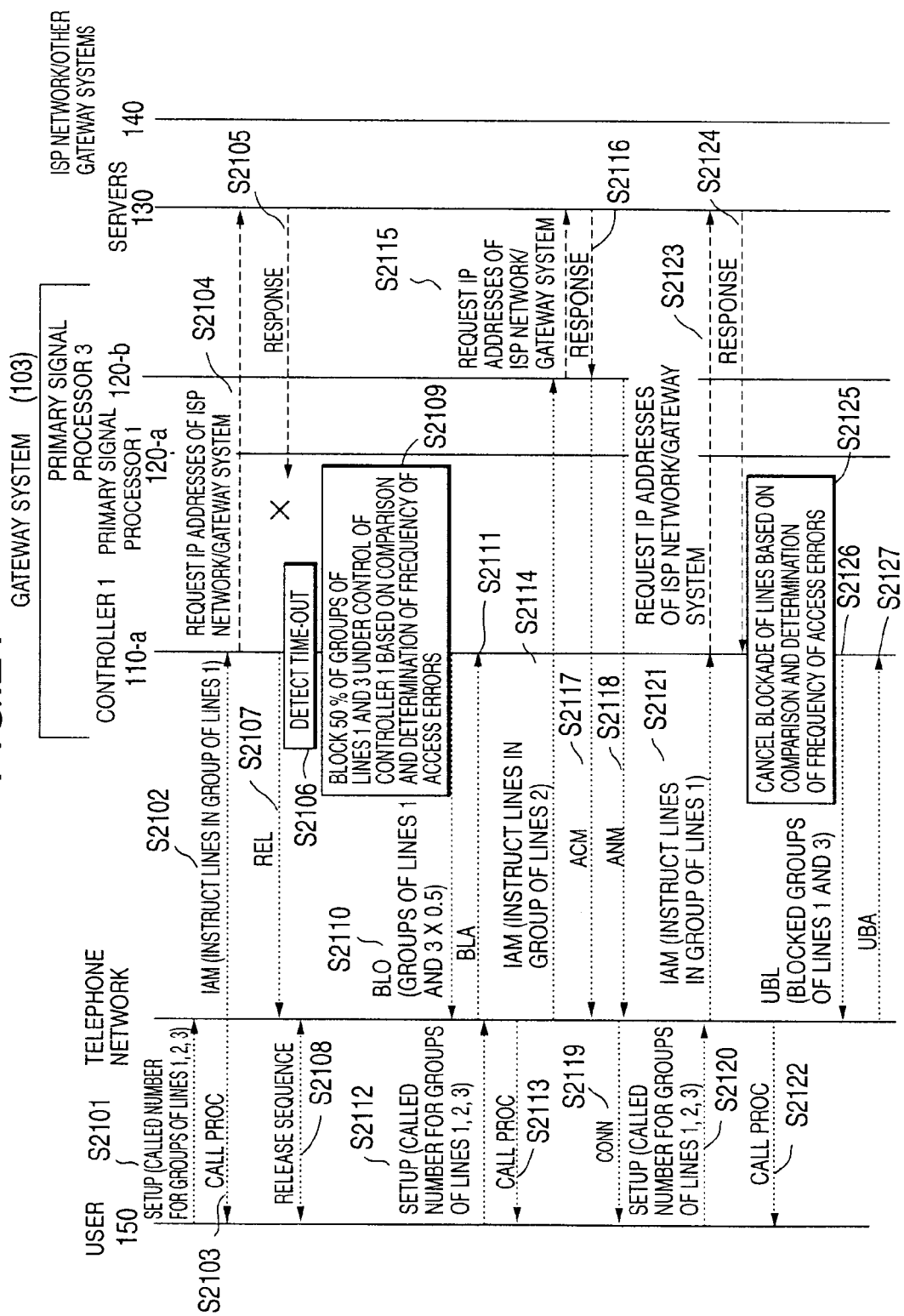
FIG. 21 is a diagram showing a sequence according to the invention for detecting a fault in the case 3 using the method 2 and performing alternative routing according to the alternative routing instructing method 5.
Figure 22:
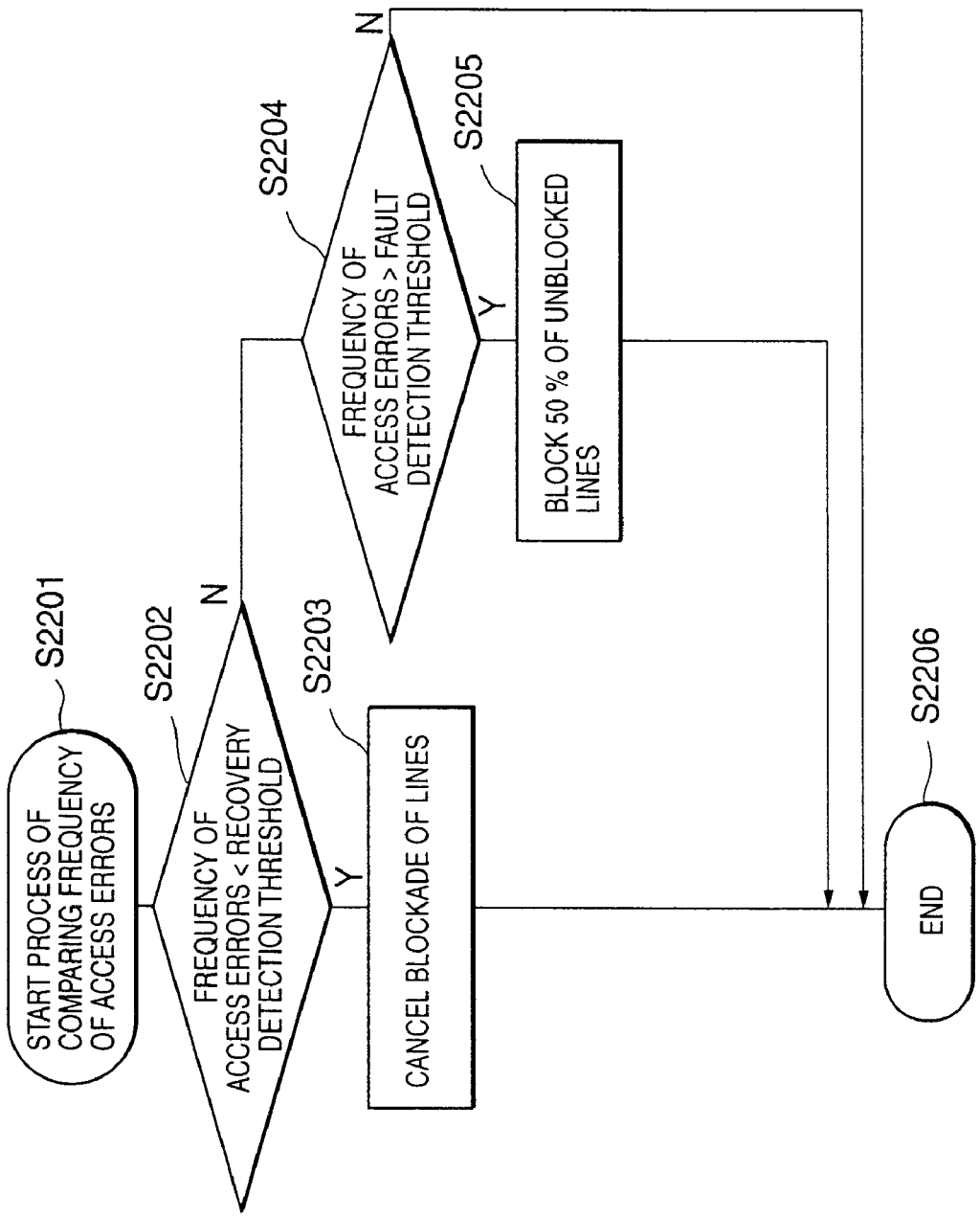
FIG. 22 is a diagram showing a flow according to the invention for detecting a fault in the case 3 using the method 2 and performing alternative routing according to the alternative routing instructing method 5.

A possible measure to instruct alternative routing and to cancel the instruction for alternative routing is to measure the frequency of faults at a channel which is determined as having consistent faults with an instruction for partial blockage given for the channel and to cancel the instruction for blockage based on a judgement that recovery from the faults has been achieved which is made when the frequency falls below a threshold managed by the controller or primary signal processor. This method is now called alternative routing instructing method 5. FIG. 20 shows an example of a network diagram in for a case in which faults are detected using the method 2 for the case 3 when the controller and the telephone network are connected through the common channel signaling #7; the telephone network is instructed to block 50% of the lines according to the alternative routing instructing method 5; blocking of 50% of the lines is further instructed if the frequency of faults still exceeds the threshold thereafter; and the blockage of the lines is partially canceled when the frequency of faults falls below the threshold for cancellation of blockage to allow the lines to be recovered from the disabled state. FIG. 21 shows an example of a sequence diagram therefore, and FIG. 22 shows an example of a flow thereof.

The processor 111 of the controller 1 (110-*a*) starts comparison and determination of the frequency of accesses errors after a call is disconnected (S2107, S2108) as a result of the detection of a fault in the case 3 from a time-out of a request for acquisition of an IP address in the IP network issued to the servers 130 in response to an incoming call 2001 from the user 150 based on the called number thereof (2002, S2105, S2106). When access errors exceed a fault threshold (S2109, S2204), the processor 111 instructs the telephone network to block 50% of the unblocked lines of the groups of lines 1 and 3 (2003, S2205).

At this time, since the groups of lines 1 and 3 are partially blocked, a part of incoming calls are alternatively routed to the group of lines 2 (2004), and the telephone network and the IP network are connected through the controller 2 and primary signal processor 2 (120-*b*) (2005, 2006, S2112 through S2119).

When the controller 1 properly acquires IP addresses in the ISP network for incoming calls to the groups of lines 1 and 3 while the groups of lines 1 and 3 are partially blocked (S2120, S2121), the processor starts the comparison and determination of the frequency of access errors again. If the frequency of access errors falls below a threshold for recovery detection (S2125, S2203), an instruction is given to cancel the blockade of the blocked lines in the groups of lines 1 and 3 (S2126, S2127).

Faults detected using the methods 1, 2 and 4 for the cases 1, 2, 3, 4 and 5 are detected at each access as a result of occurrence of an incoming call from the telephone network instead of being detected when they occur, and it is effective that alternative routing is instructed at each call. It is therefore effective to use the alternative routing instructing method 2 or 3. When faults as described above frequently occur because of causes including consistent troubles with devices forming the IP network such as routers and servers, it is appropriate to use the alternative routing instructing method 4 or 5.

Faults detected using the method 3 for the cases 1, 2 and 3 are faults which can be detected by the controller at the time of occurrence, and it is effective to instruct alternative routing for all of incoming calls to the relevant lines. It is therefore appropriate that the controller instructs the telephone network to perform alternative routing using the alternative routing instructing method 1.

Faults detected using the method 3 for the cases 4 and 5 are faults which can be detected by the controller at the time of occurrence. However, since the faults depend on the lines associated with the relevant controller and primary signal processor and the IP addresses and network address units under management, it is effective to instruct the telephone network to perform alternative routing for each call. It is therefore appropriate that the controller instructs the telephone network to perform alternative routing using the alternative routing instructing method 2 or 3.

The above-described methods 1, 2, 3 and 4 for the cases 1, 2, 3, 4 and 5 and the fault detecting method and the alternative instructing methods 1, 2, 3, 4 and 5 for the case 6 may be independently used in respective combinations and may be simultaneously applied to the system in various combinations to achieve the effects of the invention without any problem.

For example, the use of the methods for controlling alternative routing in an internet gateway system provides the following effects.

(1) It is possible to control connection of a gateway device in accordance with the state of an interface to a IP network when a telephone line is connected to the IP network, which makes it possible to improve the quality of communication in services which are remotely accesses.

(2) When a plurality of gateway devices are present in the same area, it is possible to select an optimum destination for connection for a user who remotely accesses in accordance with the interface to an IP network.

What is claimed is:

1. A gateway system comprising:
   a plurality of controllers; and
   a plurality of stream controllers for interconnecting an IP network and a telephone network, wherein
   wherein one of said plurality of controllers or one of said plurality of stream controllers determines the time of detection of a fault when the fault that has occurred in said IP network is detected;
   said controller instructs blockage of a line contained in said controller or stream controller which has detected the fault when the time of detection of the fault is the time of occurrence of the fault; and
   said telephone network is instructed to alternatively route an incoming call from said telephone network to a line contained in a controller or a stream controller different from said controller stream controller which detects the fault occurred in said IP network when the fault has been detected at the time of an access from said telephone network.

2. A gateway system for interconnecting an IP network and a telephone network, comprising:
   a plurality of controllers which are connected to said telephone network through a signal channel of an ISDN or a common line for internetwork connection and which accesses a server connected to said IP network; and a plurality of stream controllers which are connected to said telephone network through a network interface and which accesses said server, wherein one of said plurality of controllers or one of said plurality of stream controllers determines the time of detection of a fault when the fault that has occurred in said IP network is detected;

one of said plurality of controllers instructs blockage of a line contained in said controller or stream controller which has detected the fault when the time of detection of the fault is the time of occurrence of the fault; and said telephone network is instructed to alternatively route an incoming call from said telephone network to a line contained in a controller or a stream controller different from said controller or stream controller in which the gateway fault has been detected when the fault has been detected at the time of an access from said telephone network.

3. A gateway system according to claim 2, wherein when a fault is detected at the time of an access from said telephone network, one of said plurality of controllers measures the frequency of access errors after instructing alternative routing to said different controller or stream controller.

4. A gateway system according to claim 2, wherein one of said plurality of controllers includes a resource managing portion for monitoring the state of a transmission buffer in one of said plurality of stream controllers.

5. A gateway system according to claim 2, wherein one of said plurality of controllers includes a timer which is set when an access request packet is transmitted to said IP network and which measures the time spent before a response packet associated with said access request packet is received and a timer managing portion which judges that a fault has occurred when the count of said timer exceeds a predetermined time.

6. A gateway system according to claim 2, wherein one of said plurality of controllers includes a timer which is set when an access request packet is transmitted to said IP network and which measures the time spent before a response packet associated with said access request packet is received and a timer managing portion which judges that a fault has occurred when the count of said timer exceeds a predetermined time.

7. A gateway system according to claim 2, wherein in response to an access request issued by a user through said telephone network, one of said plurality of controllers or one of said plurality of stream controllers accesses an authentication server which authenticates said user and performs a connection process to an ISP network in response to the access request of the user authenticated by said authentication server.

8. A gateway system for interconnecting an IP network and a telephone network, comprising:

a plurality of controllers which are connected to said telephone network through a signal channel of an ISDN or a common line for internetwork connection and which accesses a server connected to said IP network; and a plurality of stream controllers which are connected to said telephone network through a network interface and which accesses said server, wherein one of said plurality of controllers or one of said plurality of stream controllers determines the time of detection of a fault when the fault that has occurred in said IP network is detected;

one of said plurality of controllers instructs blockage of a line contained in said controller or stream controller which has detected the fault when the time of detection of the fault is the time of occurrence of the fault;

said telephone network is instructed to alternatively route an incoming call from said telephone network to a line contained in a controller or a stream controller different from said controller or stream controller in which the gateway fault has been detected when the fault has been detected at the time of an access from said telephone network;

one of said plurality of controllers includes a timer which is set when an access request packet is transmitted to said IP network and which measures the time spent before a response packet associated with said access request packet is received and a timer managing portion which judges that a fault has occurred when the count of said timer exceeds a predetermined time; and when the number of times said timer managing portion determines the occurrence of a fault exceeds a predetermined number of times, said telephone network is instructed to block the line in which the faults have occurred said predetermined number of times.

9. A gateway system according to claim 8, wherein each said controller includes:

an interface portion connected to said IP network;

a telephone network interface connected to said telephone network; and a stream controller interface portion connected to said stream controller interface portion.

10. A method for alternative routing of a line in a gateway system for interconnecting an IP network and a telephone network, comprising the steps of:

determining the time of detection of a fault when the fault that has occurred in said IP network is detected; and instructing said telephone network to alternatively route an incoming call from said telephone network to a line contained in a controller or a stream controller different from said controller or stream controller which detects the fault occurred in said IP network when the fault has been detected at the time of an access from said telephone network.

11. A method for controlling alternative routing of a line according to claim 10, wherein when a fault is detected at the time of an access from said telephone network, the frequency of access errors is measured after instructing alternative routing to said different controller or stream controller.

12. A method for controlling alternative routing of a line according to claim 10, wherein the state of a transmission buffer in said stream controller is monitored to detect a fault in said IP network.

13. A method for controlling alternative routing of a line according to claim 10, wherein said gateway system sets a timer when an access request packet is transmitted to said IP network, measures the time spent before a response packet associated with said access request packet is received and judges that a fault has occurred when the count of said timer exceeds a predetermined time.

14. A method for controlling alternative routing of a line according to claim 10, further comprising the steps of accessing an authentication server which authenticates a user in response to an access request issued by the user through said telephone network and performing a connection process to an ISP network in response to the access request of the user authenticated by said authentication server.

15. A method for controlling alternative routing of a gateway system for interconnecting an IP network and a telephone network, comprising the steps of:

determining the time of detection of a fault when the fault that has occurred in said IP network is detected;

instructing blockage of a line contained in a controller or stream a controller which has detected the fault when the time of detection of the fault is the time of occurrence of the fault;

instructing said telephone network to alternatively route an incoming call from said telephone network to a line contained in a controller or a stream controller different from said controller or stream controller in which the gateway fault has been detected when the fault has been detected at the time of an access from said telephone network;

setting a timer when an access request packet is transmitted to said IP network, measuring the time spent before a response packet associated with said access request packet is received and a timer managing portion and judging that a fault has occurred when the count of said timer exceeds a predetermined time; and instructing said telephone network to block the line in which faults have occurred a predetermined number of times when the number of times said timer managing portion determines the occurrence of a fault exceeds said predetermined number of times.

* * * * *